(12) United States Patent  (10) Patent No.: US 8,525,793 B2
Sentchenkoff et al.  (45) Date of Patent: Sep. 3, 2013

(54) VEHICLE WITH A DISPLAY DEVICE OPERATED FROM A HANDLEBAR

(75) Inventors: Alan Sentchenkoff, Granby (CA); Richard Lefebvre, Lorraine (CA)

(73) Assignee: Bombardier Recreational Products Inc., Valcourt (CA)

( * ) Notice: Subject to any disclaimer, the term of this patent is extended or adjusted under 35 U.S.C. 154(b) by 377 days.

(21) Appl. No.: 12/994,947

(22) PCT Filed: May 30, 2008

(86) PCT No.: PCT/US2008/065367
§ 371 (c)(1), (2), (4) Date: Nov. 29, 2010

(87) PCT Pub. No.: WO2009/145786
PCT Pub. Date: Dec. 3, 2009

(65) Prior Publication Data
US 2011/0074689 A1  Mar. 31, 2011

(51) Int. Cl.
*G06F 3/02* (2006.01)
*G09G 5/00* (2006.01)

(52) U.S. Cl.
USPC .......................................... 345/168; 345/156

(58) Field of Classification Search
USPC ................................. 345/156, 157, 168, 169
See application file for complete search history.

(56) References Cited

U.S. PATENT DOCUMENTS

| 6,225,584 B1 | 5/2001 | Ase et al. |
| 2002/0014565 A1 | 2/2002 | Ase et al. |
| 2005/0000747 A1 | 1/2005 | Richlen et al. |

FOREIGN PATENT DOCUMENTS

| EP | 1129931 A2 | 9/2001 |
| EP | 1323955 A1 | 7/2003 |

OTHER PUBLICATIONS

International Search Report of PCT/US2008/065367; Feb. 3, 2009; Helmut Wagner.

*Primary Examiner* — Ricardo L Osorio
(74) *Attorney, Agent, or Firm* — BCF LLP

(57) ABSTRACT

A vehicle is disclosed having at least one sound output device to receive an output of at least one audio signal transmitting device. A display device has a plurality of display modes. A first plurality of buttons (254) includes four first buttons arranged in a generally circular pattern. At least one second button (256,258) is arranged in proximity to the generally circular pattern. One of the second buttons selects a display mode of the display device. The first plurality of buttons controls the output of a audio signal transmitting device associated with the selected display mode. An output of the sound-producing device associated with the selected mode is transmitted to the rider via the at least one sound output device. One of the second buttons changes a function of at least one of the first plurality of buttons.

20 Claims, 20 Drawing Sheets

VEHICLE WITH A DISPLAY DEVICE OPERATED FROM A HANDLEBAR

CROSS-REFERENCE

The present application is the U.S. National Stage of PCT/US2008/065367, filed May 30, 2008, entitled 'Vehicle with a Display Device Operated from a Handlebar', the entirety of which is incorporated herein by reference.

FIELD OF THE INVENTION

The present invention relates to vehicles with display devices operated from handlebars.

BACKGROUND OF THE INVENTION

Many vehicles, such as cars, motorcycles and three-wheeled road vehicles, come equipped with a sound system having one or more sound output devices, such as speakers or a headphone jack. The output devices receive a signal from one or more audio signal transmitting devices, such as a citizen's band (CB) radio, an AM/FM radio, or a CD player installed in the vehicle, or a portable audio device such as an iPod™ or an MP3 player that can be connected to the vehicle. An output signal generated by the audio signal transmitting device is converted to audible sound by the output device to provide information or entertainment to a rider while operating the vehicle.

During operation of the vehicle, the rider may desire to control the operation of the sound system, for example to select a different audio signal transmitting device or output device; to select a different frequency, track or channel of the selected device; or to adjust the volume of the sound produced by the output device. This can be done via buttons located on the vehicle, for example on a center console, and positioned within reach of the rider when he is seated in a normal driving position. The buttons can be used to select one audio signal transmitting device from among the several audio signal transmitting devices installed on the vehicle or connected thereto. The buttons can also be used to control the operation of the device, for example selecting a particular song or radio frequency. The buttons can also be used to adjust the volume of the sound and select the output device used to output the sound to the rider.

Information about the operation of the sound system is displayed on a display device, generally forwardly of the rider. The information displayed may include the selected device, an identification of the selected song or radio frequency, and the volume of the output device.

While this system is adequate, it has some drawbacks. Operating buttons located on a center console requires the rider to remove at least one of his hands from the handlebar, possibly resulting in reduced control over the vehicle. In addition, the rider must look at the center console to locate the desired button, which draws the rider's attention away from operating the vehicle. The same drawbacks can be present in buttons located on a handlebar, if the arrangement of the buttons is not sufficiently ergonomic, simple and intuitive that the rider can operate the buttons without looking at them and/or removing his hand from the handlebar.

Therefore, there is a need for an ergonomic interface that enables the rider to be able to control the operation of the sound system more quickly and easily, so that the rider can easily reach the buttons, efficiently obtain the desired sound output and return to enjoying the operation of the vehicle.

SUMMARY OF THE INVENTION

It is an object of the present invention to ameliorate at least some of the inconveniences present in the prior art.

It is also an object of the present invention to provide an ergonomic interface enabling the rider of a vehicle to easily control the operation of a sound system of the vehicle.

It is also an object of the present invention to provide a handlebar-mounted interface enabling the rider of a vehicle to easily control the operation of a sound system of the vehicle.

In one aspect, the invention provides a vehicle comprising a frame. A vehicle body is connected to the frame. An engine is supported at least in part by the frame for powering the vehicle. At least one seat is supported by the frame for receiving a rider thereon. A handlebar is disposed at least in part forwardly of the seat for steering the vehicle. The handlebar has two handles. A display device is disposed forwardly of the seat for displaying information to the rider. The display device has a plurality of selectable display modes. A control unit is electronically connected to at least one audio signal transmitting device. Each of the at least one audio signal transmitting device has at least one display mode associated therewith. At least one sound output device is electronically connected to the control unit. The at least one sound output device is operative to receive an output of the at least one audio signal transmitting device and output audible sound to a rider. First and second pluralities of buttons are disposed on a generally rear-facing side of the handlebar next to one of the two handles. Each of the first and second pluralities of buttons is electrically connected to the control unit. Each of the first and second pluralities of buttons is positioned in proximity of the one of the two handles. The first plurality of buttons includes four first buttons arranged in a generally circular pattern. The second plurality of buttons includes two second buttons arranged side by side in proximity to the generally circular pattern. The two second buttons are positioned at approximately the same distance from the generally circular pattern. One of the two second buttons is operative to select a display mode of the display device from the plurality of display modes. The first plurality of buttons is operative to control the output of the audio signal transmitting device associated with the selected display mode. The control unit causes an output of the sound-producing device associated with the selected mode to be transmitted to the rider via the at least one sound output device. Another of the two second buttons is operative to change a function of at least one of the first plurality of buttons in at least one of the plurality of display modes.

In a further aspect, the two second buttons are arranged side by side above the generally circular pattern.

In a further aspect, the four first buttons include: a top button disposed above a center of the generally circular pattern; a bottom button disposed below the center of the generally circular pattern; a left button disposed leftwardly of the center of the generally circular pattern; and a right button disposed rightwardly of the center of the generally circular pattern.

In a further aspect, the top and bottom buttons are operative to control a volume of the audible sound output by the at least one sound output device in at least two of the plurality of display modes.

In a further aspect, the display device is integrated in a display cluster of the vehicle.

In a further aspect, the plurality of selectable display modes include at least two display modes selected from: a CB mode associated with a CB radio electronically connected to the vehicle; a radio mode associated with at least one of an AM, FM or satellite radio electronically connected to the vehicle; a first auxiliary mode associated with a first auxiliary device electronically connected to the vehicle; a second auxiliary mode associated with a second auxiliary device electronically connected to the vehicle; a status mode, the output of the status mode of the display device being indicative of a status of the vehicle; and a preference mode, wherein the four first buttons being operative to configure at least one parameter of at least one display mode of the display device when the preference mode is selected.

In a further aspect, the output of the display device is indicative of a function of at least one of the four first buttons for the selected mode.

In a further aspect, a vehicle speed sensor is electronically connected to the control unit. The vehicle speed sensor sends a signal representative of vehicle speed to the control unit. One of the at least two display modes is the preference mode. The control unit prevents the preference mode from being selected if the vehicle speed is above a predetermined threshold speed.

In a further aspect, the control unit selects a predetermined one of the plurality of selectable display modes if the control unit has not received an input from either one of the first and second pluralities of buttons for a predetermined period of time.

In a further aspect, the predetermined one of the plurality of selectable display modes is the status mode.

In a further aspect, the at least one sound output device is at least two sound output devices. The second plurality of buttons is operative to select at least one of the at least two sound output devices in at least one of the plurality of display modes. The control unit causes the output of the at least one audio signal transmitting device associated with the selected display mode to be received by the selected one of the at least two sound output devices.

In a further aspect, the top and bottom buttons are operative to control a volume of the audible sound output by the selected sound output device in at least two of the plurality of display modes.

In a further aspect, at least a portion of each of the buttons in the first and second pluralities of buttons is within about 70 mm of an inside end of the one of the two handles.

In a further aspect, at least a portion of each of the buttons in the first and second pluralities of buttons is between about 45 mm and 59 mm of an inside end of the one of the two handles.

In a further aspect, a center of the generally circular pattern is within about 52 mm of an inside end of the one of the two handles.

In a further aspect, a housing is disposed adjacent the inside end of the one of the two handles. The first and second pluralities of buttons are disposed on the housing.

In a further aspect, at least a portion of the housing is back-lit.

In an additional aspect, the invention provides a vehicle comprising a frame. A vehicle body is connected to the frame. An engine is supported at least in part by the frame for powering the vehicle. At least one seat is supported by the frame for receiving a rider thereon. A handlebar is disposed at least in part forwardly of the seat for steering the vehicle. The handlebar has two handles. A display device is disposed forwardly of the seat for displaying information to the rider. The display device has a plurality of selectable display modes. A control unit is electronically connected to the display device. At least one audio signal transmitting device is electronically connected to the control unit. Each of the at least one audio signal transmitting device has at least one display mode associated therewith. At least one sound output device is electronically connected to the control unit. The at least one sound output device is operative to receive an output of the at least one audio signal transmitting device and output audible sound to a rider. A plurality of first buttons is disposed on a generally rear-facing side of the handlebar next to one of the two handles. Each of the plurality of first buttons is electrically connected to the control unit. Each of the plurality of first buttons is positioned in proximity of the one of the two handles. The plurality of first buttons includes four first buttons arranged in a generally circular pattern. At least one second button is arranged in proximity to the generally circular pattern. The at least one second button is operative to select a display mode of the display device from the plurality of display modes. The plurality of first buttons is operative to control the output of the audio signal transmitting device associated with the selected display mode. The control unit causes an output of the sound-producing device associated with the selected mode to be transmitted to the rider via the at least one sound output device. The at least one second button is operative to change a function of at least one of the first plurality of buttons upon selection of a display mode.

In a further aspect, the at least one second button includes two second buttons arranged side by side above the generally circular pattern. One of the two second buttons is operative to select a display mode of the display device from the plurality of display modes. The other of the two second buttons is operative to change a function of at least one of the first plurality of buttons in at least one of the plurality of display modes.

In a further aspect, the four first buttons include: a top button disposed above a center of the generally circular pattern; a bottom button disposed below the center of the generally circular pattern; a left button disposed leftwardly of the center of the generally circular pattern; and a right button disposed rightwardly of the center of the generally circular pattern.

In a further aspect, the top and bottom buttons are operative to control a volume of the audible sound output by the at least one sound output device in at least two of the plurality of display modes.

In a further aspect, the plurality of selectable display modes include at least two display modes selected from: a CB mode associated with a CB radio electronically connected to the vehicle; a radio mode associated with at least one of an AM, FM or satellite radio electronically connected to the vehicle; a first auxiliary mode associated with a first auxiliary device electronically connected to the vehicle; a second auxiliary mode associated with a second auxiliary device electronically connected to the vehicle; a status mode, the output of the status mode of the display device being indicative of a status of the vehicle; and a preference mode, wherein the four first buttons being operative to configure at least one parameter of at least one display mode of the display device when the preference mode is selected.

For purposes of this application, terms relating to spatial orientation, such as "forwardly" and "rearwardly" are defined consistently with a forward travel direction of the vehicle.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a three-wheeled vehicle having a handlebar for steering. However it should be understood that the invention could be used in other wheeled vehicles having a handlebar for steering such as but, not limited to, a motorcycle, a scooter, a snowmobile and an all-terrain vehicle (ATV). U.S. Pat. No. 6,732,830, issued May 11, 2004, the entirety of which is incorporated herein by reference, describes the general features of an ATV. U.S. Pat. No. 7,070,012, issued Jul. 4, 2006, the entirety of which is incorporated herein by reference, describes the general features of an snowmobile.

Figure 1:
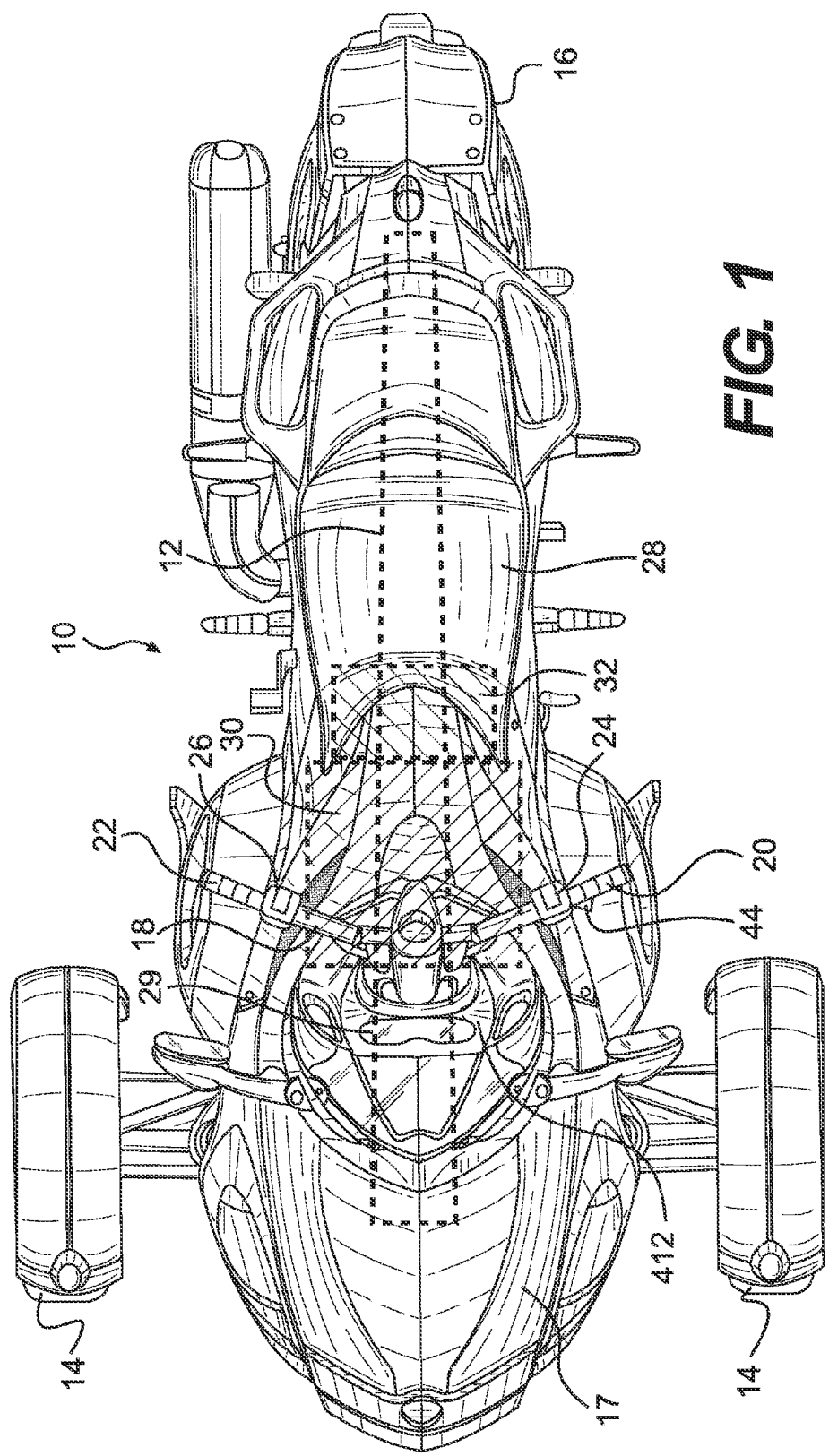
FIG. 1 is a top view of a three-wheeled vehicle in accordance with the present invention.

As shown in FIG. 1, a three-wheeled vehicle 10 has a frame 12 (shown schematically) to which two front wheels 14 and one rear wheel 16 are connected. A body 17 composed of one or more fairings is connected to the frame to shield some components of the vehicle from the elements and provide aesthetic appeal. A handlebar 18 is connected to the two front wheels 14 for steering the two front wheels 14. The handlebar 18 has a left handle 20 and a right handle 22 disposed at the ends of the handlebar 18. At least one left housing 24 and at least one right housing 26 are disposed adjacent their respective handles 20, 22. The handles 20, 22 and housings 24, 26 will be described in greater detail below. The handlebar 18 is disposed forwardly of a straddle seat 28 which is supported by the frame 12. A display cluster 29 is disposed generally forwardly of the seat 28 for displaying information to the rider. The function of the display cluster 29 will be described in further detail below. An engine 30 (shown schematically) is disposed on the frame 12 vertically below the seat 28. A transmission 32 (shown schematically) is operatively connected to the engine 30 and the rear wheel 16 to transmit power from the engine 30 to the rear wheel 16. United States Patent Application Publication No. 2008/0023242 A1, published Jan. 31, 2008, the entirety of which is incorporated herein by reference, describes additional features of a three-wheeled vehicle similar to the three-wheeled vehicle 10.

A vehicle speed sensor 304 (FIG. 12) is electronically connected to a control unit 100 and sends a signal representative of the vehicle speed to the control unit 100. The vehicle speed sensor 304 could be a sensor disposed near one of the wheels 14, 16 to sense a speed of rotation of the one of the wheels 14, 16 from which the speed of the vehicle 10 can be determined. Alternatively, the vehicle speed sensor 304 could be part of a global positioning system (GPS) provided on the vehicle 10. Other types of vehicle speed sensors 304 are also contemplated. As would be understood, the vehicle speed can be determined with a GPS by calculating a change of position of the vehicle 10 over time.

Figure 2:
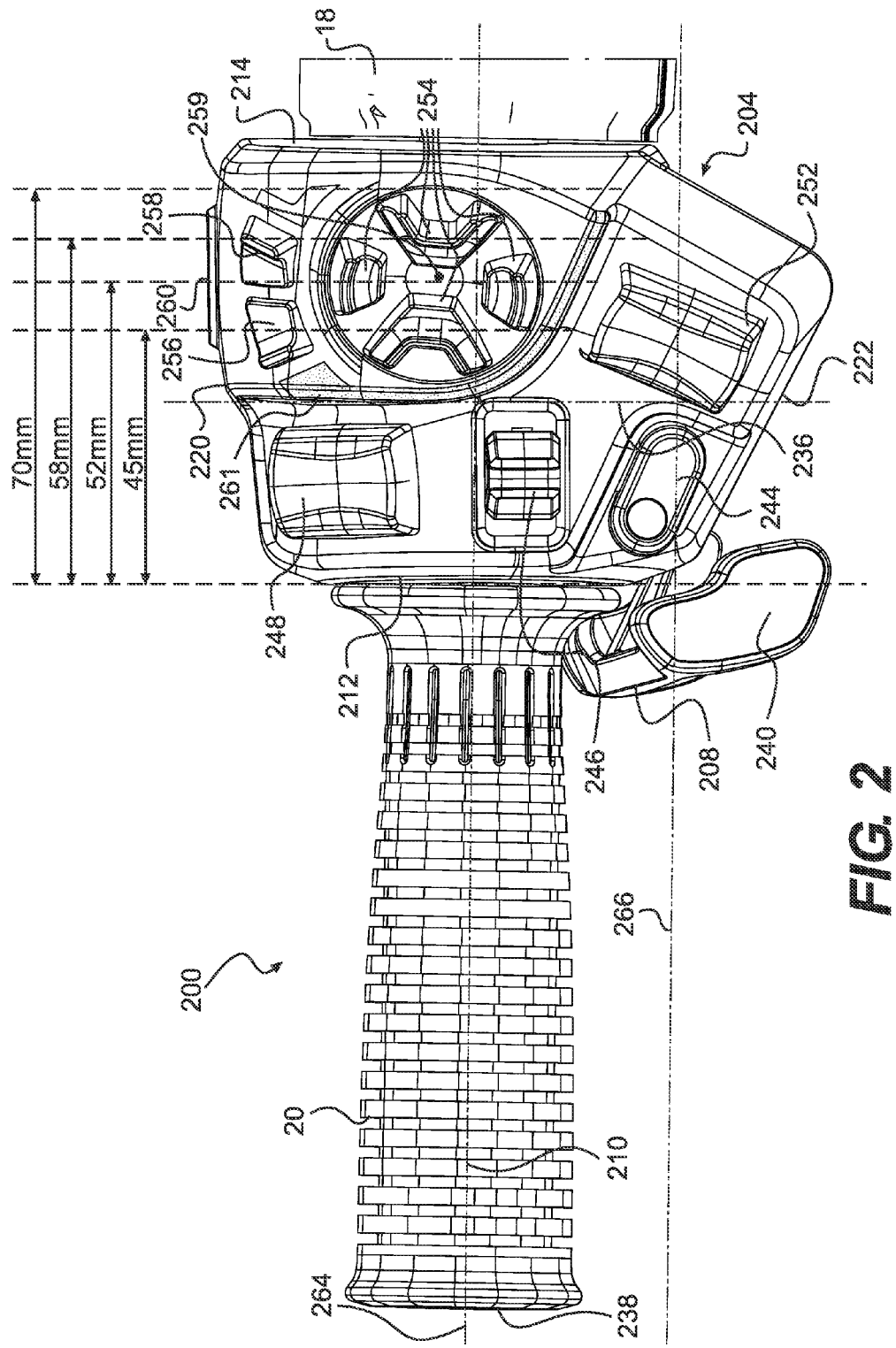
FIG. 2 is a rear elevation view of a handle and housing arrangement of the vehicle of FIG. 1.
Figure 3:
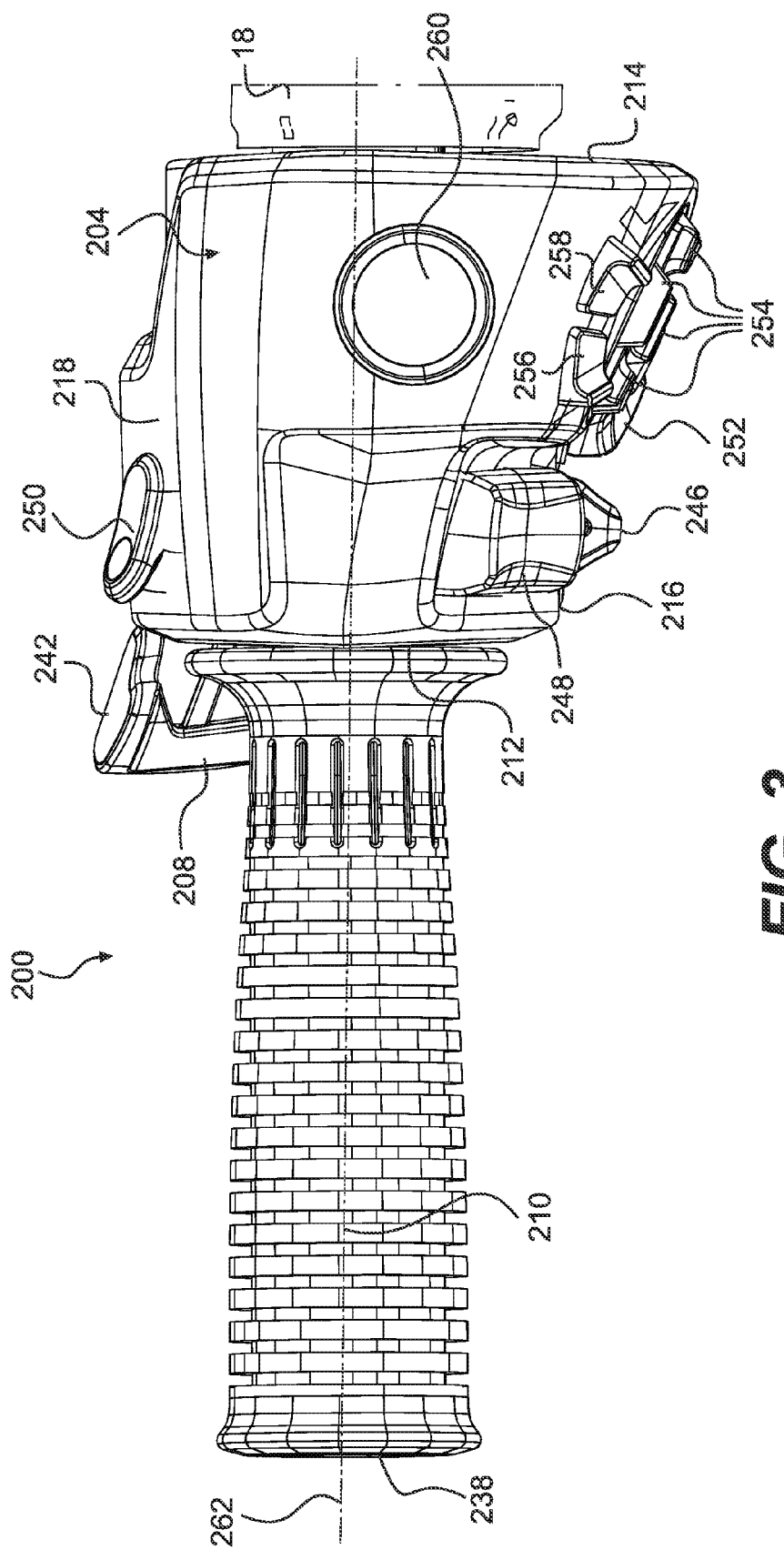
FIG. 3 is a top plan view of the arrangement of FIG. 2.
Figure 4:
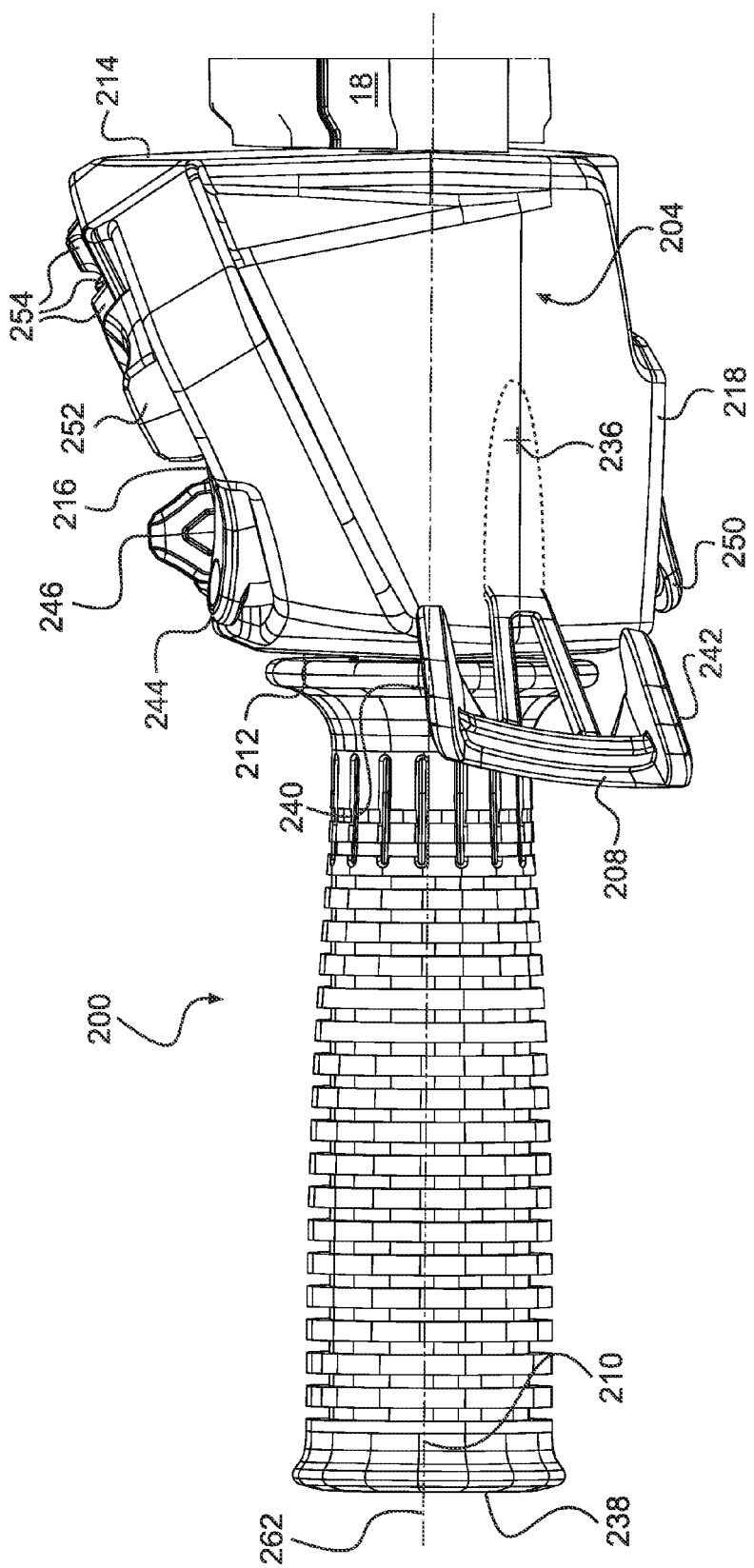
FIG. 4 is a bottom plan view of the arrangement of FIG. 2.

Turning now to FIGS. 2-4, an embodiment of a handle and housing arrangement 200 will be described. The arrangement 200 includes a left handle 20, a housing 204, a shifter in the form of shift lever 208, and various switches disposed on the housing 204 (described below). It is contemplated that the arrangement 200 could be provided on the other end of the handlebar 18, and as a result would include a right handle 22 instead of the left handle 20.

The handle 20 is preferably made of an elastomeric material and has indentations along its length in order to improve gripping of the handle 20. The handle 20 defines a longitudinal centerline 210 passing through a center thereof in a longitudinal direction.

The housing 204 is disposed adjacent to the handle 20. The housing 204 has a left side 212 (the handle side), a right side 214, a front side 216, a rear side 218, an upper surface 220, and a lower surface 222. The front and rear sides 216, 218 face generally towards a front and a rear of the vehicle 10 respectively when disposed on the handlebar 18 as shown in FIG. 1.

The shift lever 208 is pivotally connected to the housing 204 about shift lever axis 236 (FIG. 4). As can be seen in FIG. 2, the shift lever axis 236 is generally perpendicular to the longitudinal centerline 210 of the handle 20. As can also be seen in FIG. 8, the shift lever 208 extends away from the left side 212 of the housing 204 toward the end 238 of the handle 20 and is disposed at least in part vertically below the handle 20. The shift lever 208 has a rear surface 240 adapted to be pressed by a thumb of a driver of the vehicle 10 and a front surface 242 adapted to be pressed by an index finger of the driver (although other fingers may be used). When the shift lever 208 is in the rest position as shown, the rear and front surfaces 240, 242 face generally towards the rear and the front of the vehicle 10 respectively when disposed on the handlebar 18 as shown in FIG. 1. As seen in FIG. 2, the rear surface 240 is generally L-shaped. As also seen in FIG. 2, a portion of the rear surface 240 extends vertically above the lower surface 222 of the housing 204. This positions the rear surface 240 in a location where it can be easily pressed by the thumb of the driver.

In a preferred embodiment, pressing the rear surface 240 of the shift lever 208 towards the front of the vehicle 10 moves the shift lever 208 to the up-shift position and pressing the front surface 242 of the shift lever 208 towards the rear of the vehicle 10 moves the shift lever 208 to the down-shift position. It is contemplated, however, that pressing the rear surface 240 could alternatively move the shift lever 108 to the down-shift position and that pressing the front surface 242 would move the shift lever 208 to the up-shift position.

A push button 244 is provided on the rear side 218 of the housing 204. Pushing the push button 244 actuates a horn of the vehicle 10. A sliding switch 246 is provided on the rear side 218 of the housing 204 vertically above the push button 244. Sliding the sliding switch 246 to the left actuates a left turn signal of the vehicle 10. Similarly, sliding the sliding switch 246 to the right actuates a right turn signal of the vehicle 10. A toggle switch 248 is disposed near an upper surface 220 of the housing 204. The toggle switch 248 is used to control the headlights of the vehicle 10. The toggle switch 248 has three positions. In the first position, the headlights are turned on in a low beam mode. In the second position, the headlights are turned on in a high beam mode which provides more light than in the low beam mode. In the third position, the headlights are turned on momentarily to the high beam mode and return to the low beam mode since the third position of the switch 248 is biased towards the second position. A push button 250 is provided on the front side 216 of the housing 204. If the helmet of the driver is equipped with a CB radio which is connected to the vehicle 10, pushing the push button 250 allows the driver of the vehicle 10 to communicate with drivers of other vehicles equipped with similar CB radio.

By positioning the push button 244, the sliding switch 246, the toggle switch 248, and the push button 250 on the housing 204 near the left handle 20, they can be easily reached by the fingers of the left hand of the driver.

A toggle switch 252 is disposed on the rear side 216 of the housing 204 laterally next to the push button 244. The toggle switch 252 is used to raise or lower a windshield of the vehicle 10. A set of four push buttons 254 are disposed in a circular pattern on the rear side 216 of the housing laterally next to the sliding switch 246 and the toggle switch 248 and vertically above the toggle switch 252. Vertically positioned above the push buttons 254, are a mode button 256 and a set button 258 which are disposed side by side at approximately the same distance above the circular pattern. It is contemplated that the set button 258 may alternatively be omitted, in which case the mode button 256 would perform the functions of the set button 258 described below. It is further contemplated that the mode button 256 and the set button 258 may alternatively be positioned in any other suitable position nearby the circular pattern, for example below the circular pattern. The push buttons 254, 256, 258 are preferably positioned so they can be easily reached by the fingers of the left hand of the driver. In particular, the center 259 of the circular pattern is positioned about 52 mm from the flanged inside end of the handle 20 and at least a portion of each of the buttons 254, 256, 258 is disposed within 70 mm of the flanged inside end of the handle 20, and preferably between 45 mm and 59 mm of the flanged inside end of the handle 20, so that the buttons can be conveniently reached by a thumb of the rider. The housing 204 includes a backlit portion 261 disposed at least in part between the buttons 254, 256, 258 and the buttons 244, 246, 248, 252. The backlit portion 261 helps the rider to visually identify the area on the housing where the buttons 254, 256, 258 are located. The function of the buttons 254, 256 and 258 will be described below.

A push button 260 is disposed on the upper surface 220 of the housing 206. The push button 260 is a reverse actuator which needs to be pushed while the shift lever 108 is moved in order for the reverse gear 34 to be selected by the semi-automatic transmission 32. By locating the push button 260 above the handle 20 and the shift lever 208 below the handle 20 as shown, the shift lever 208 cannot be moved and the push button 260 pushed simultaneously by using the fingers of the left hand only. Therefore, the driver has to remove his right hand from the right handle 22 and use a finger of the right hand to push the push button 260 while the finger(s) of the left hand are used to move the shifter 208. By forcing the driver to release the right handle 22 to push the push button 260, the driver also releases the throttle actuator of the vehicle 10, which eventually reduces the speed of the vehicle 10 below the desired level at which the reverse gear 34 can be selected.

Figure 12:
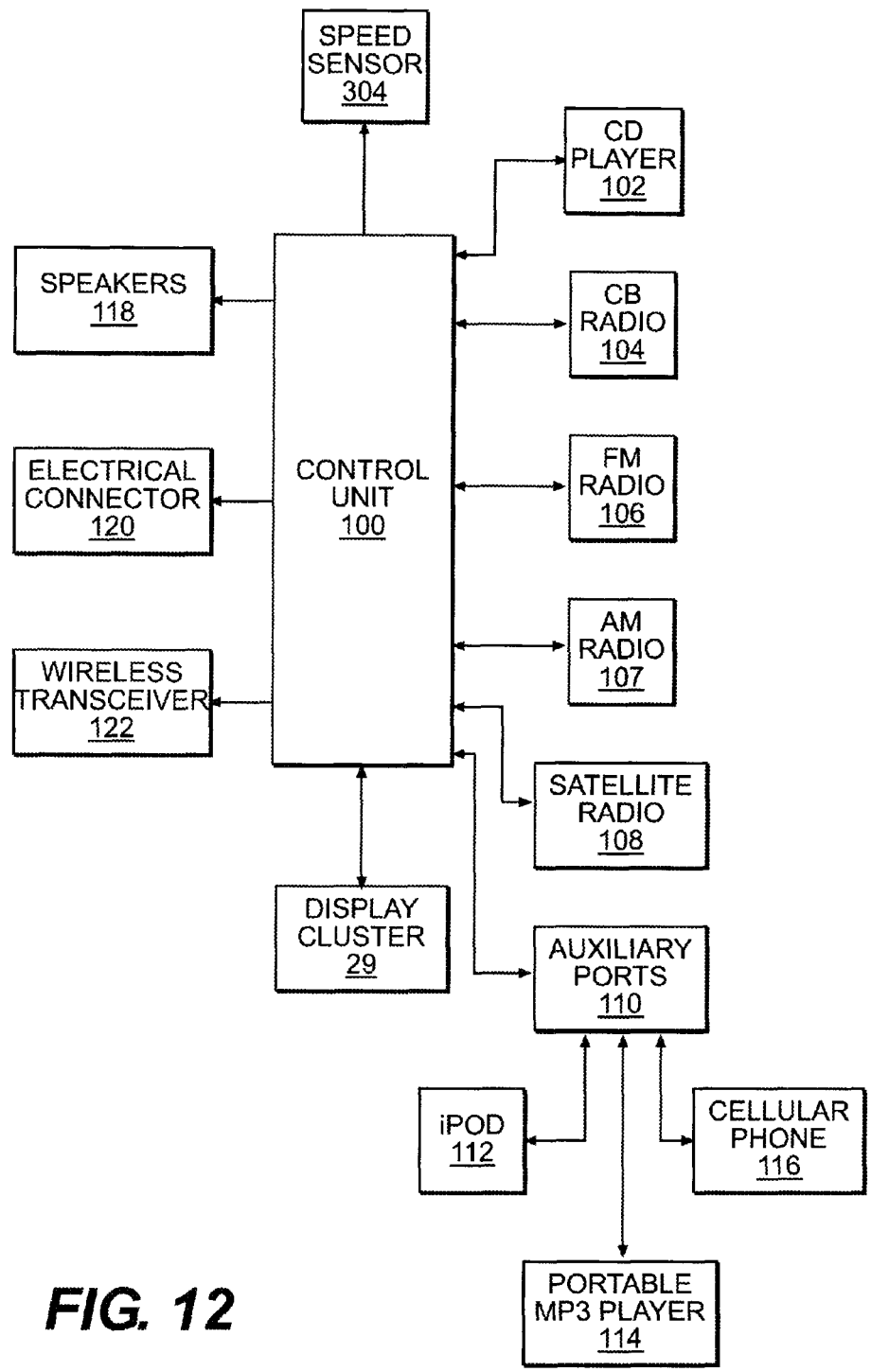
FIG. 12 is a schematic representation of inputs and outputs of a control unit of the vehicle of FIG. 1.

Referring now to FIG. 12, the control unit 100 and the components connected thereto in accordance with an embodiment of the present invention will now be described.

At least one audio signal transmitting device is electronically connected to the vehicle 10, for producing sound that can be output to the rider via at least one sound output device. The types and operation of the audio signal transmitting devices and the sound output devices will be described below in further detail.

The control unit 100 is electronically connected to a plurality of audio signal transmitting devices, including a CD player 102, a CB radio 104, an FM radio 106, an AM radio 107, a satellite radio 108, and one or more auxiliary ports 110 to which external devices such as an iPod™ 112, portable MP3 player 114 or cellular telephone 116 can be electronically connected. Each auxiliary port 110 may be an electrical connector located on the vehicle 10 to which an external device can be connected, or it may be a wireless transceiver such as a Bluetooth™ system that communicates with an external device via a wireless connection. It should be understood that a particular vehicle 10 may not have all of these audio signal transmitting devices, or may have others. The control unit 100 transmits signals to the audio signal transmitting devices to control their operation, and receives signals from the audio signal transmitting devices regarding their status and their output, as will be described in further detail below.

The control unit 100 is also electronically connected to a plurality of sound output devices, including one or more speakers 118, an electrical connector 120 adapted to connect to a set of headphones (not shown), and a wireless transceiver 122 such as a Bluetooth™ system that communicates with an external device (not shown) in a helmet (not shown) of a rider or a headset (not shown) via a wireless connection. It should be understood that a particular vehicle 10 may have one or more, but not all, of these sound output devices, or may have others. The control unit 100 transmits signals to the sound output devices to control their operation, and to send to a selected sound output device an output of one or more of the audio signal transmitting devices, as will be described in further detail below. The sound output devices receive the output of the audio signal transmitting devices, and output audible sound to the rider.

The control unit 100 is also electronically connected to the display cluster 29. The control unit 100 sends signals to the display cluster 29 to cause the display cluster 29 to display information to the rider, as will be described below.

Figure 7A:
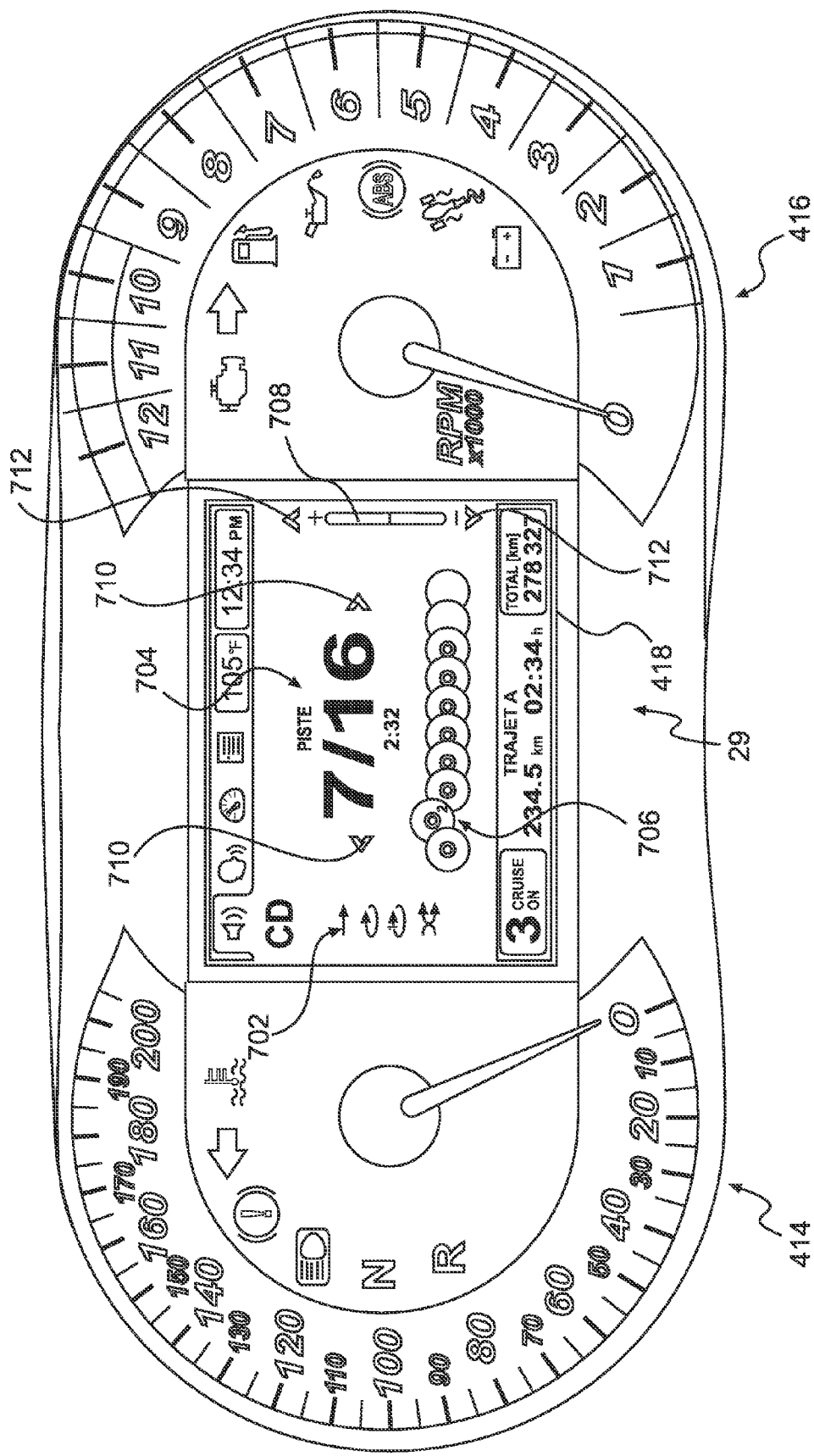
FIGS. 7A and 7B are elevation views of a vehicle display cluster according to an embodiment of the present invention in a CD player mode, showing different display configurations.

Referring to FIG. 7A, the display cluster 29 is incorporated into a vehicle dashboard 412 (FIG. 1). A speedometer 414 indicates the current speed of the vehicle and a tachometer 416 indicates the current speed of engine rotation. The display cluster 29 may also include other gauges or indicators, such as a fuel gauge. A central region of the dashboard 412 includes a display device in the form of a screen 418 configured to digitally display information which is viewable by the rider when seated on the vehicle, in response to signals received from the control unit 100. Incorporating the screen 418 into the vehicle dashboard 412 as part of a display cluster 29 results in a compact and aesthetically pleasing arrangement, and allows the rider to conveniently view the screen 418 and return to viewing the road ahead of the vehicle 10. In addition, a single screen 418 can display information via several display modes that would otherwise require many different gauges or displays. However, it is contemplated that the screen 418 may alternatively be a separate unit disposed in any convenient location on the vehicle where it can be seen by the rider while operating the vehicle. It is further contemplated that any suitable type of display device may be used as the screen 418, such as an LCD display, an LED display, or a series of icons that may be selectively back-lit from behind the dashboard 412 to make individual icons visible to the rider.

Figure 13:
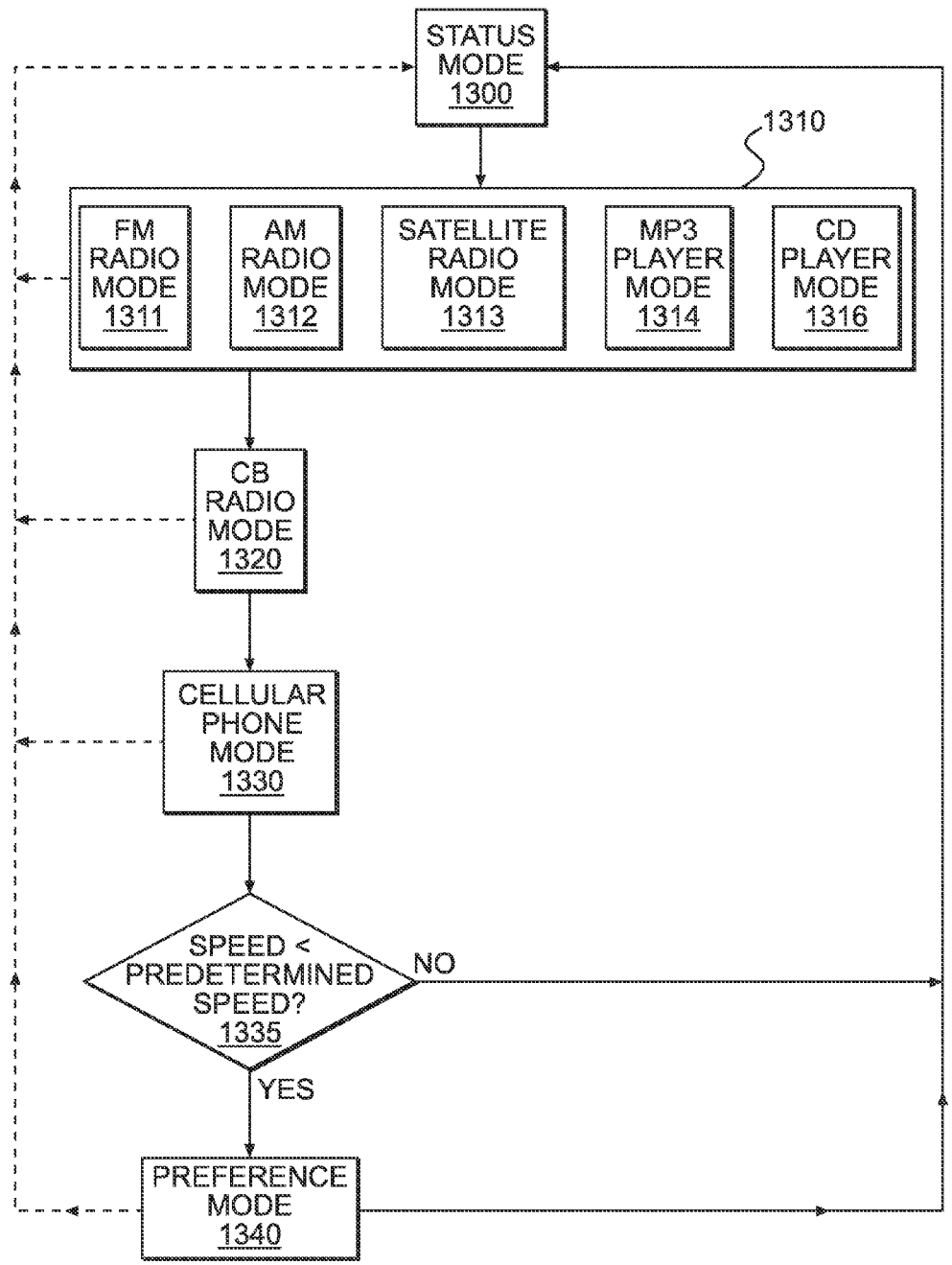
FIG. 13 is a logic diagram of a method of selecting the display modes of the vehicle display cluster of FIGS. 5A-11.

Referring to FIG. 13, the screen 418 has a plurality of selectable display modes, each of which will be described below in further detail. The mode button 256 is used to select one of the display modes, thereby causing the selected display mode to be displayed on the screen 418. The status mode 1300 is initially selected. While the status mode 1300 is selected, pressing the mode button 256 causes one of the audio modes 1310 to be selected. The audio modes 1310 include a plurality of modes associated with respective audio signal transmitting devices, including an FM radio mode 1311, an AM radio mode 1312, a satellite radio mode 1313, an MP3 player mode 1315, and a CD player mode 1316. While any one of the audio modes 1310 is selected, the rider may select any of the other audio modes 1310 using the buttons 254 and the set button 258 as will be described below. It is contemplated that some or all of the audio modes 1310 may alternatively be selectable by pressing the mode button 256. While one of the audio modes 1310 is selected, pressing the mode button 256 causes the CB radio mode 1320 to be selected. While the CB radio mode 1320 is selected, pressing the mode button 256 causes the cellular phone mode 1330 to be selected. While the cellular phone mode 1330 is selected, pressing the mode button 256 causes the control unit 100 to compare the vehicle speed to a predetermined speed at 1335. If the vehicle speed is below the predetermined speed, the control unit 100 causes the preference mode 1340 to be selected. If the vehicle speed is not below the predetermined speed, the control unit causes the status mode 1300 to be selected. The predetermined speed is preferably below 5 km/h, and may be zero km/h, to ensure that the preference mode is used only at slow speeds or while the vehicle is stopped, so that the rider may safely devote the additional attention required to navigate the display mode. While the preference mode 1340 is selected, pressing the mode button 256 causes the status mode 1300 to be selected.

It is contemplated that when the control unit does not receive an input from any of the buttons 254, 256, 258 for a predetermined period of time while a display mode other than the status mode 1300 is selected, the control unit 100 causes the status mode 1300 to be selected. This provides convenience for the driver, because it allows the display to automatically revert to displaying information regarding the status of the vehicle once the rider is finished selecting options in the previously selected mode. When the status mode 1300 is selected in this manner, the audio signal transmitting device associated with the previously selected mode may continue to be selected, and the audio output from the audio signal transmitting device associated with the previously selected mode will continue uninterrupted. In this manner, the rider may continue to listen to the FM radio 106, for example, even though the status mode 1300 has been automatically selected. The predetermined time may be any convenient interval, such as 5 seconds.

It is further contemplated that when a display mode other than the status mode 1300 is selected, and the rider has selected one or more options in the selected mode, pressing the mode button 256 may cause the control unit 100 to automatically select the status mode 1300. This allows the rider to conveniently return to the status mode 1300 after configuring the desired audio output. When the status mode 1300 is selected in this manner, the audio signal transmitting device associated with the previously selected mode may continue to be selected, and the audio output from the audio signal transmitting device associated with the previously selected mode will continue uninterrupted. In this manner, the rider may continue to listen to the FM radio 106, for example, even though the status mode 1300 has been automatically selected.

Some exemplary display modes will now be described, referring to FIGS. 5A-11. It should be understood that additional display modes are contemplated, corresponding to additional audio signal transmitting devices that are connected to the vehicle. It is further contemplated that a particular display mode may not be present, or may not be selectable, when the audio signal transmitting device associated therewith is not connected to the vehicle 10. For example, when no MP3 player 114 is connected to the vehicle 10, the MP3 mode 1315 would be skipped from the sequence of mode selection when pressing the mode button 256.

Figure 5A:
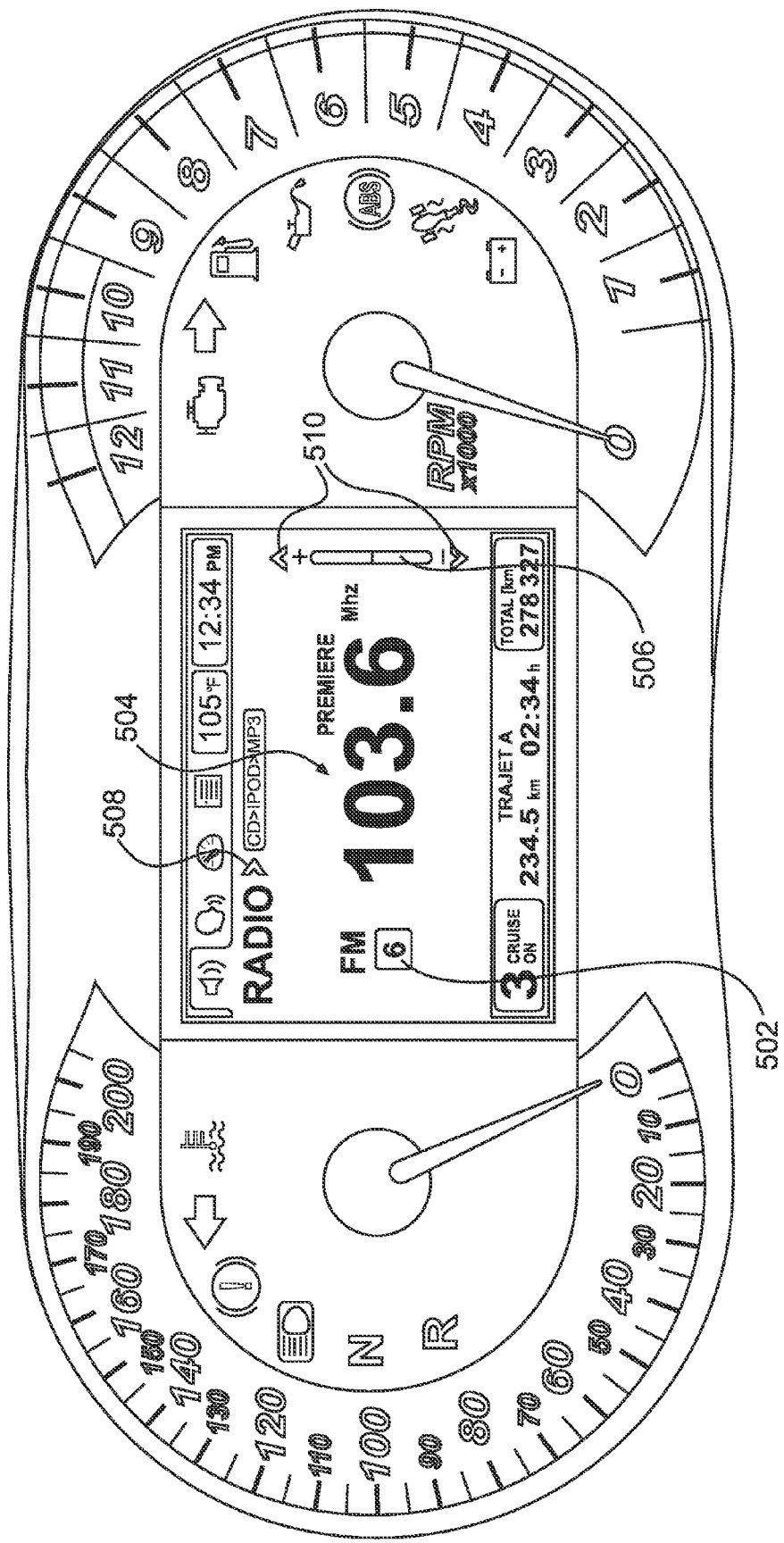
FIGS. 5A-5D are elevation views of the vehicle display cluster in an FM radio mode, showing different display configurations.

FIG. 5A shows the display in an FM radio mode 1311. The FM radio mode 1311 is associated with an FM radio 106 installed in the vehicle 10 or connectable to the vehicle 10. The screen 418 displays information regarding the status of the FM radio 106. An icon 502 represents the pre-set station number corresponding to the current station. Numbers 504 represent the radio frequency of the current station. A bar 506 indicates the sound volume. The screen 418 also displays information indicative of the function of the buttons 254. The horizontal arrow 508 indicates that the function of the right button 254 is to change the display mode to one of the CD mode 1316, or an auxiliary mode such as an MP3 player mode 1315, which will be discussed below in further detail. Vertical arrows 510 indicate that the function of the top and bottom buttons 254 is to raise or lower the volume.

Figure 5B:
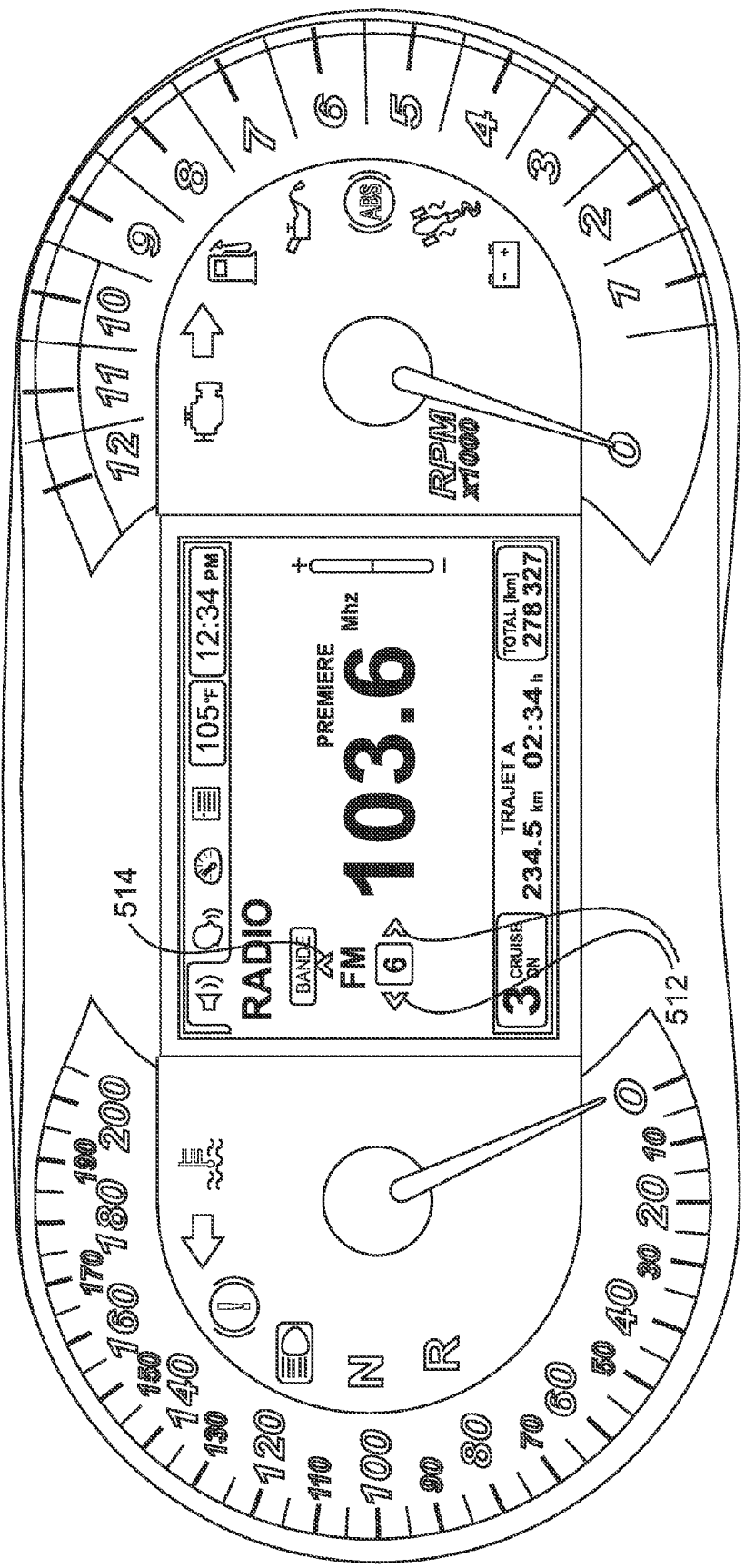
Figure 5C:
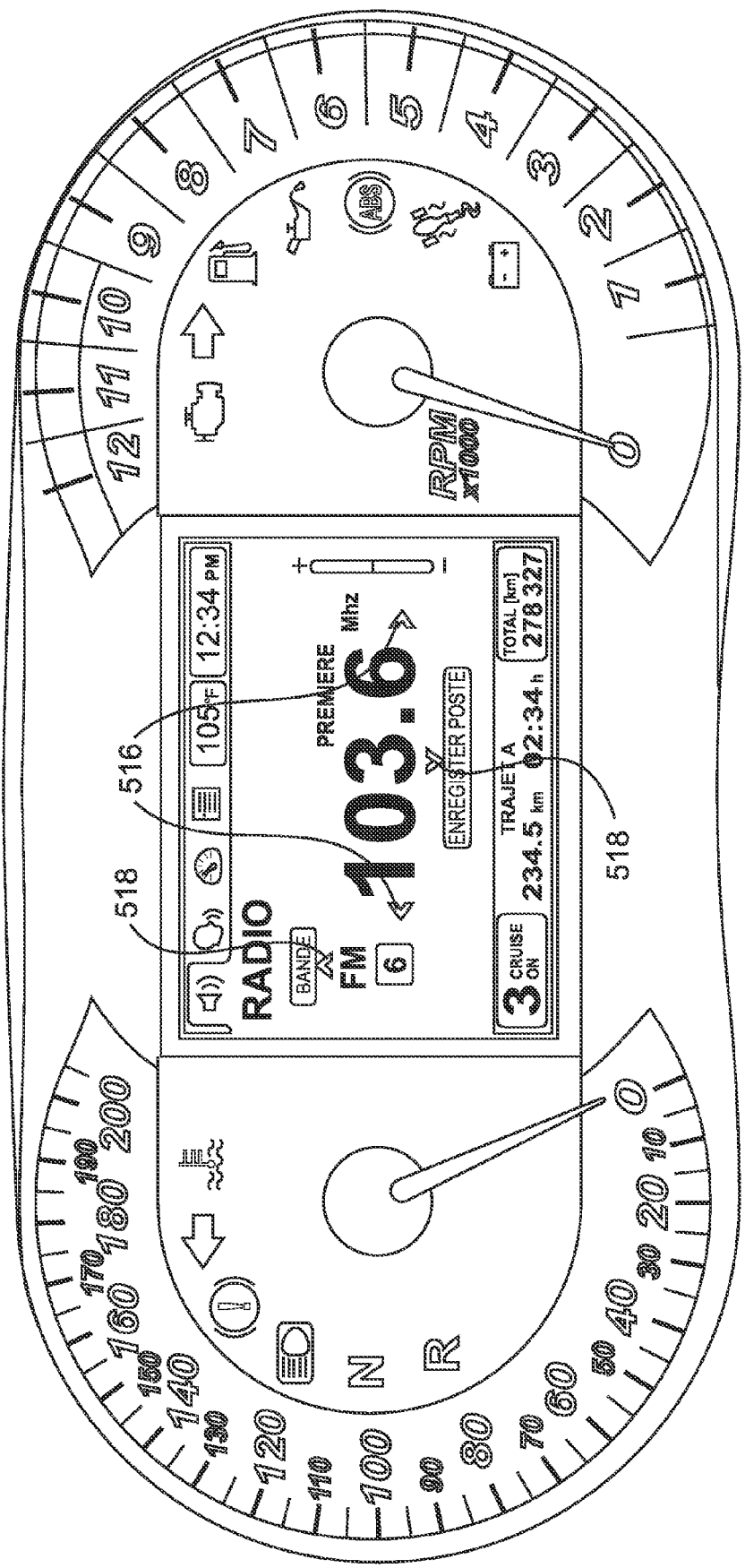
Figure 5D:
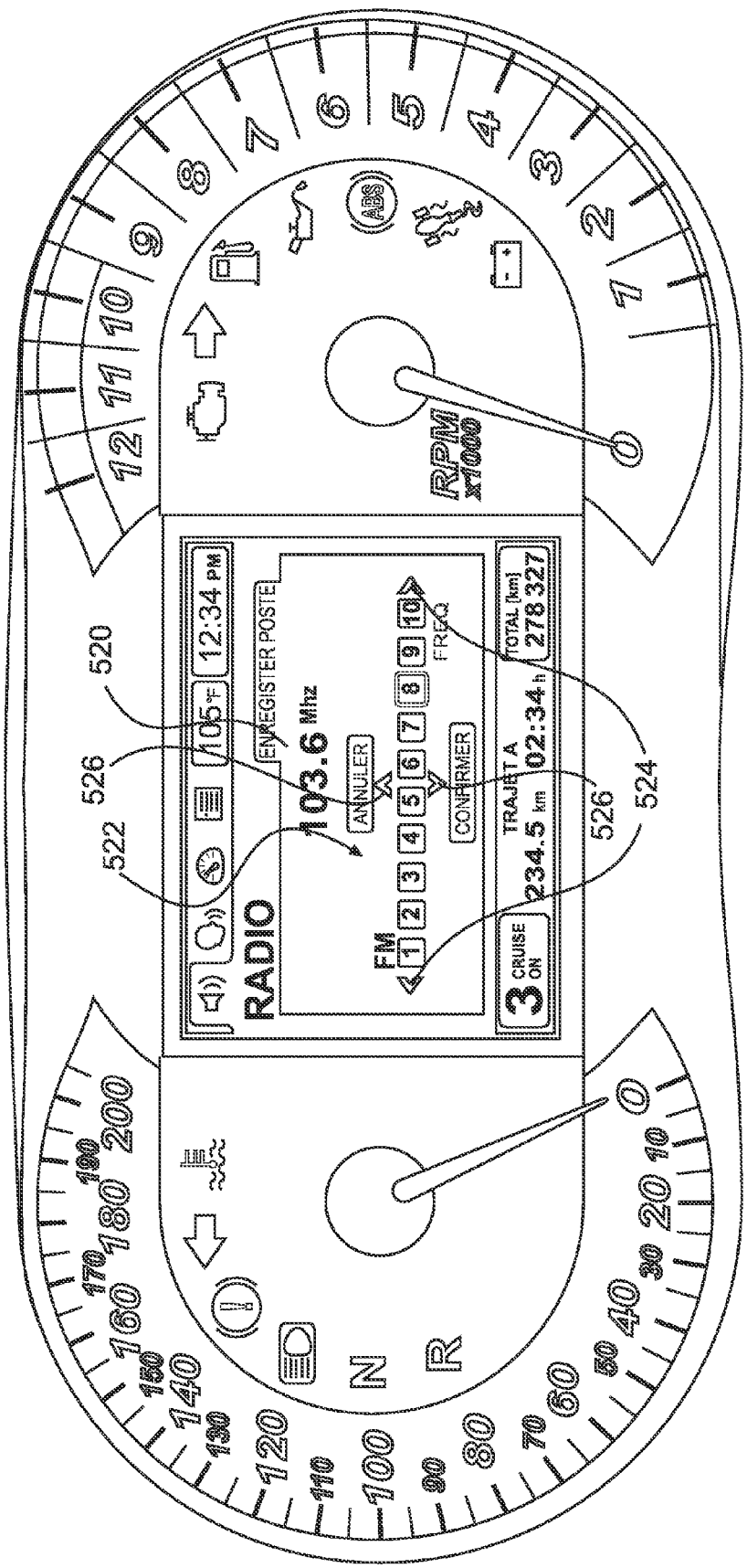

The set button 258 can be used to change the function of the top and bottom buttons 254, for example by cycling through the states shown in FIGS. 5A, 5B and 5C. Referring to FIG. 5B, the horizontal arrows 512 indicate that the function of the left and right buttons 254 is now to select a pre-set station. The vertical arrow 514 indicates that the function of the top button 254 is to change the radio band, thereby selecting an AM radio mode 1312 or a satellite radio mode 1313. The AM radio mode 1312 and the satellite radio mode 1313 function similarly to the FM radio mode 1311, and will not be described separately in detail. Referring now to FIG. 5C, the horizontal arrows 516 indicate that the function of the left and right buttons 254 is now to change the radio frequency. The vertical arrows 518 indicate that the function of the top button 254 is to change the radio band, and the function of the bottom button 254 is to activate the display shown in FIG. 5D. FIG. 5D shows a menu available in the FM radio mode 1311 that allows the rider to save the current radio frequency as one of several pre-set stations. Referring now to FIG. 5D, the screen 418 displays numbers 520 indicating the current radio frequency, and icons 522 representing a number of pre-set radio stations. The horizontal arrows 524 indicate that the function of the left and right buttons 254 is now to select one of the pre-set radio stations. The vertical arrows 526 indicate that the function of the bottom button 254 is to confirm saving the current radio frequency as a pre-set station, and the function of the top button 254 is to cancel the saving and return to the display of FIG. 5C.

Figure 6A:
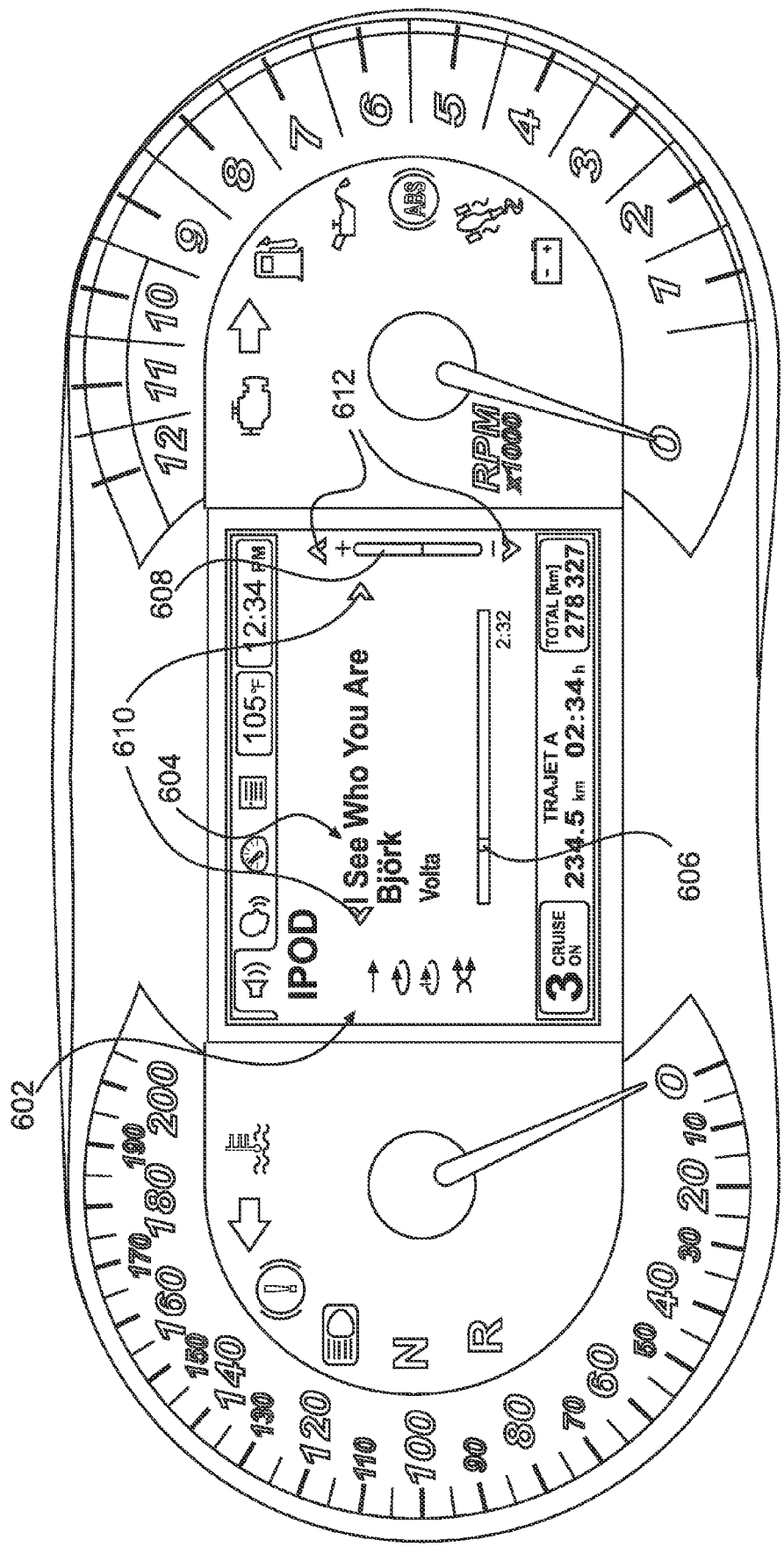
FIGS. 6A-6C are elevation views of the vehicle display cluster in an iPod™ mode, showing different display configurations.

FIG. 6A shows the display in a first auxiliary mode. The first auxiliary mode is an MP3 player mode 1314 associated with an iPod™ music player 112 or other MP3 player 114 connectable to the vehicle 10. The screen 418 displays information regarding the status of the music player 112, 114. Icons 602 represent the play mode (single track, repeat track, repeat all, randomize). Text 604 represents the song title and artist. A progress bar 606 represents the portion of the song currently being played. A bar 608 indicates the sound volume. The screen 418 also displays information indicative of the function of the buttons 254. Horizontal arrows 610 indicate that the function of the left and right buttons 254 is to change the song being played. Vertical arrows 612 indicate that the function of the top and bottom buttons 254 is to raise or lower the volume.

Figure 6B:
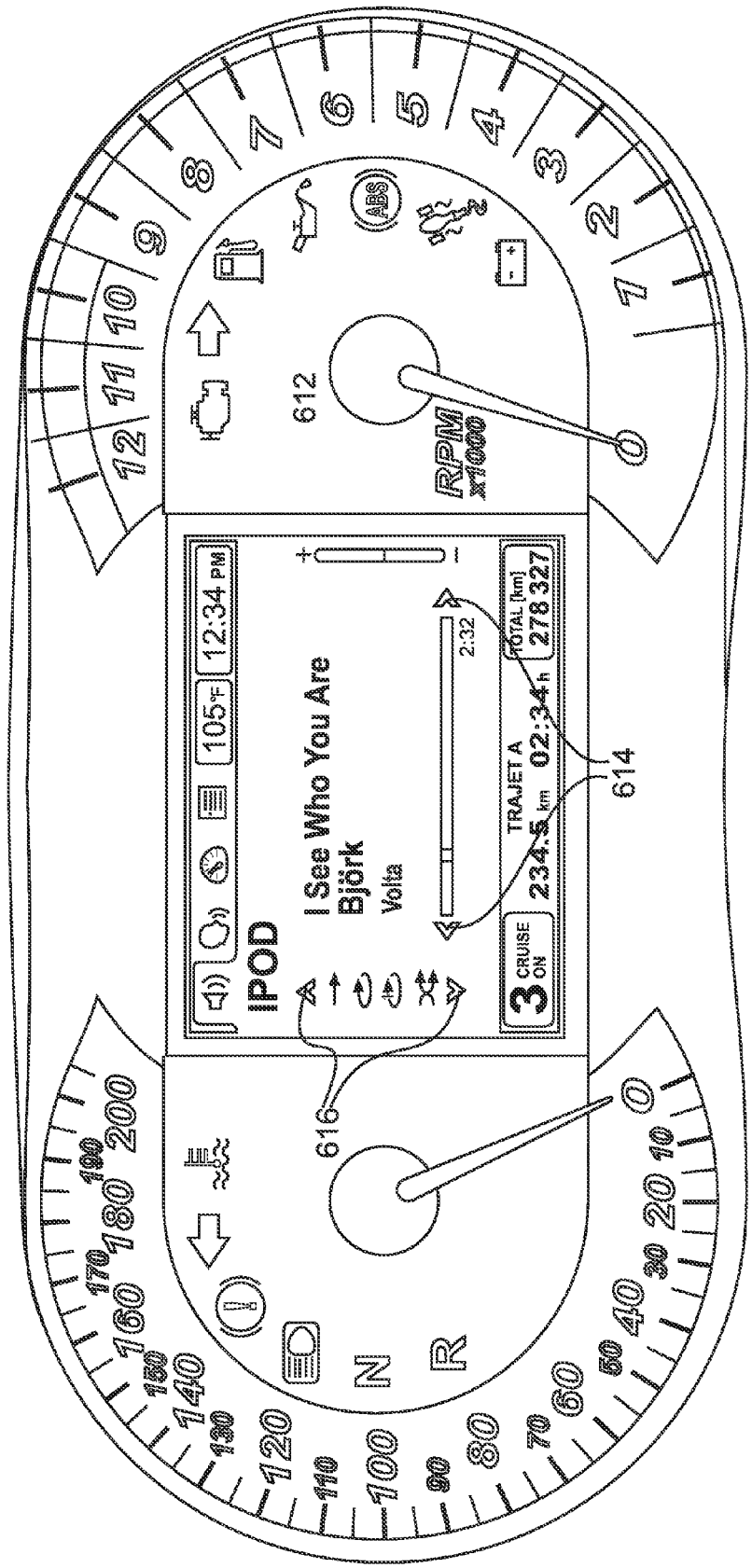

The set button 258 can be used to change the function of the top and bottom buttons 254, as shown in FIG. 6B. The horizontal arrows 614 indicate that the function of the left and right buttons 254 is now to fast-forward or rewind the song, and the vertical arrows 616 indicate that the function of the top and bottom buttons 254 is to change the play mode.

Figure 6C:
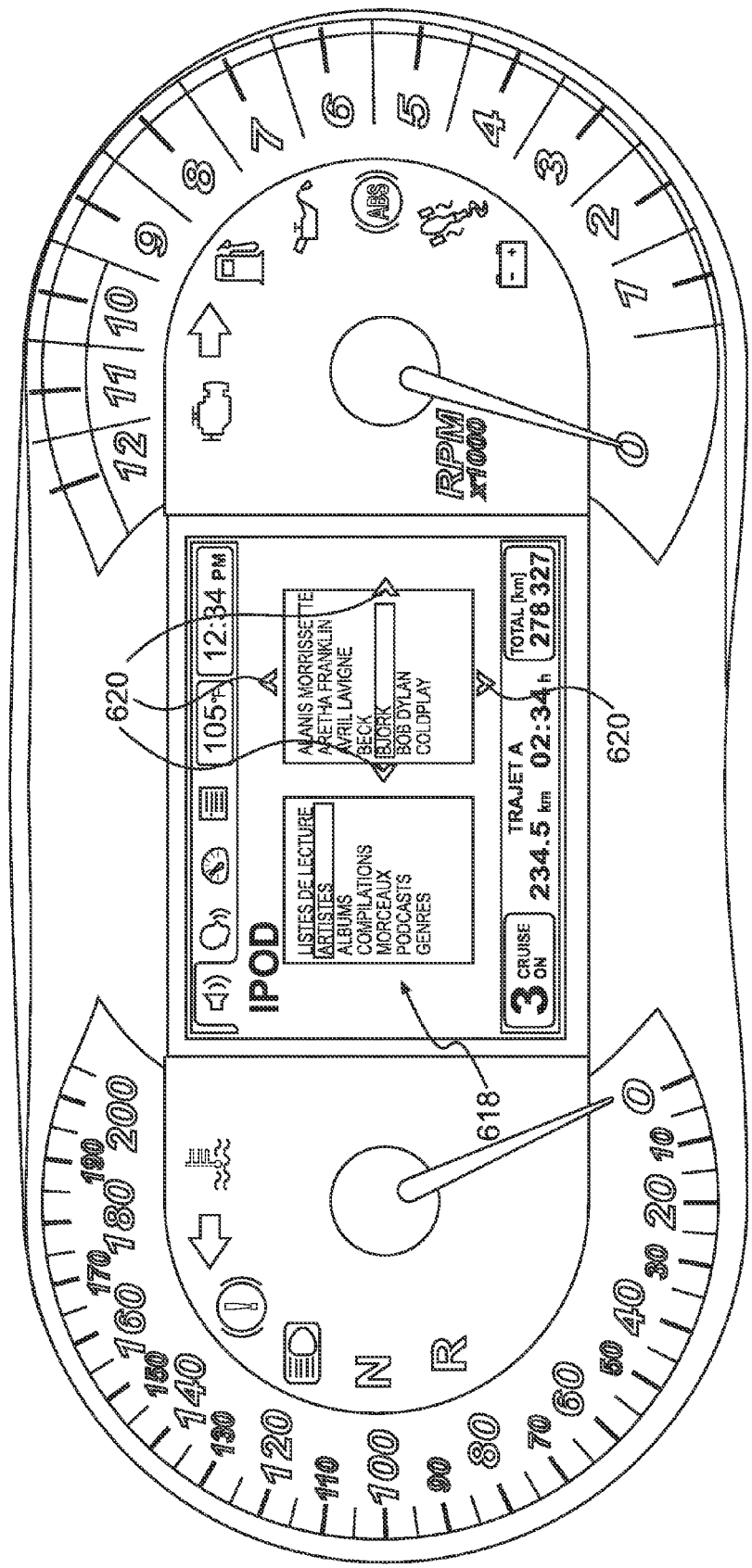

FIG. 6C shows a menu available in the MP3 player mode 1314 that can be accessed by the set button 258. The screen 418 shows a menu 618 that can be used to select an audio recording to be played. The menu 618 is navigated with the buttons 254, as shown by the arrows 620. A menu option can be selected, for example by using the right arrow, thereby returning to the display of FIG. 6A or 6B.

It is contemplated that the display may have additional auxiliary modes associated with other auxiliary devices electronically connectable to the vehicle 10.

FIG. 7A shows the display in a CD player mode 1316. The CD player mode 1316 is associated with a CD player 102 installed in the vehicle 10 or connectable to the vehicle 10. The screen 418 displays information regarding the status of the CD player 102. Icons 702 represent the play mode (single track, repeat track, repeat all, randomize) Numbers 704 represent the number of the track currently being played. Icons 706 represent the number of the disc currently being played. A bar 708 indicates the sound volume. The screen 418 also displays information indicative of the function of the buttons 254. Horizontal arrows 710 indicate that the function of the left and right buttons 254 is to change the track number, and vertical arrows 712 indicate that the function of the top and bottom buttons 254 is to raise or lower the volume of the sound output to the rider. The control unit 100 may raise or lower the volume in response to the use of the top and bottom buttons 254 either by reducing the volume of the signal produced by the audio signal transmitting device, or by reducing the volume of the sound output device.

Figure 7B:
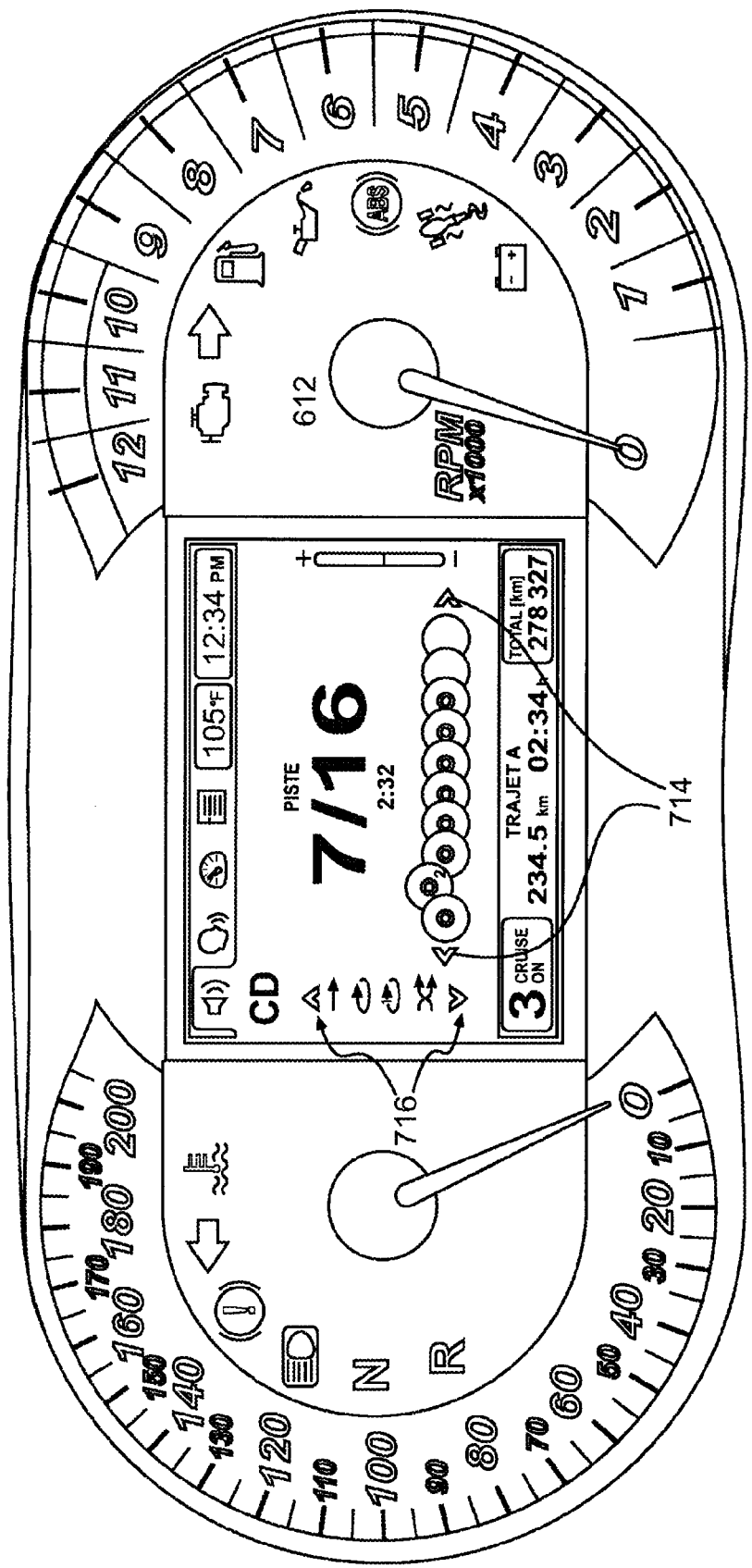

The set button 258 can be used to change the function of the top and bottom buttons 254, as shown in FIG. 7B. The horizontal arrows 714 indicate that the function of the left and right buttons 254 is now to change the disc number, and the vertical arrows 716 indicate that the function of the top and bottom buttons 254 is to change the play mode. Other combinations of functions are also contemplated for the buttons 254. For example, the left and right buttons 254 may change the disc number and the top and bottom buttons 254 may raise or lower the volume.

Figure 8:
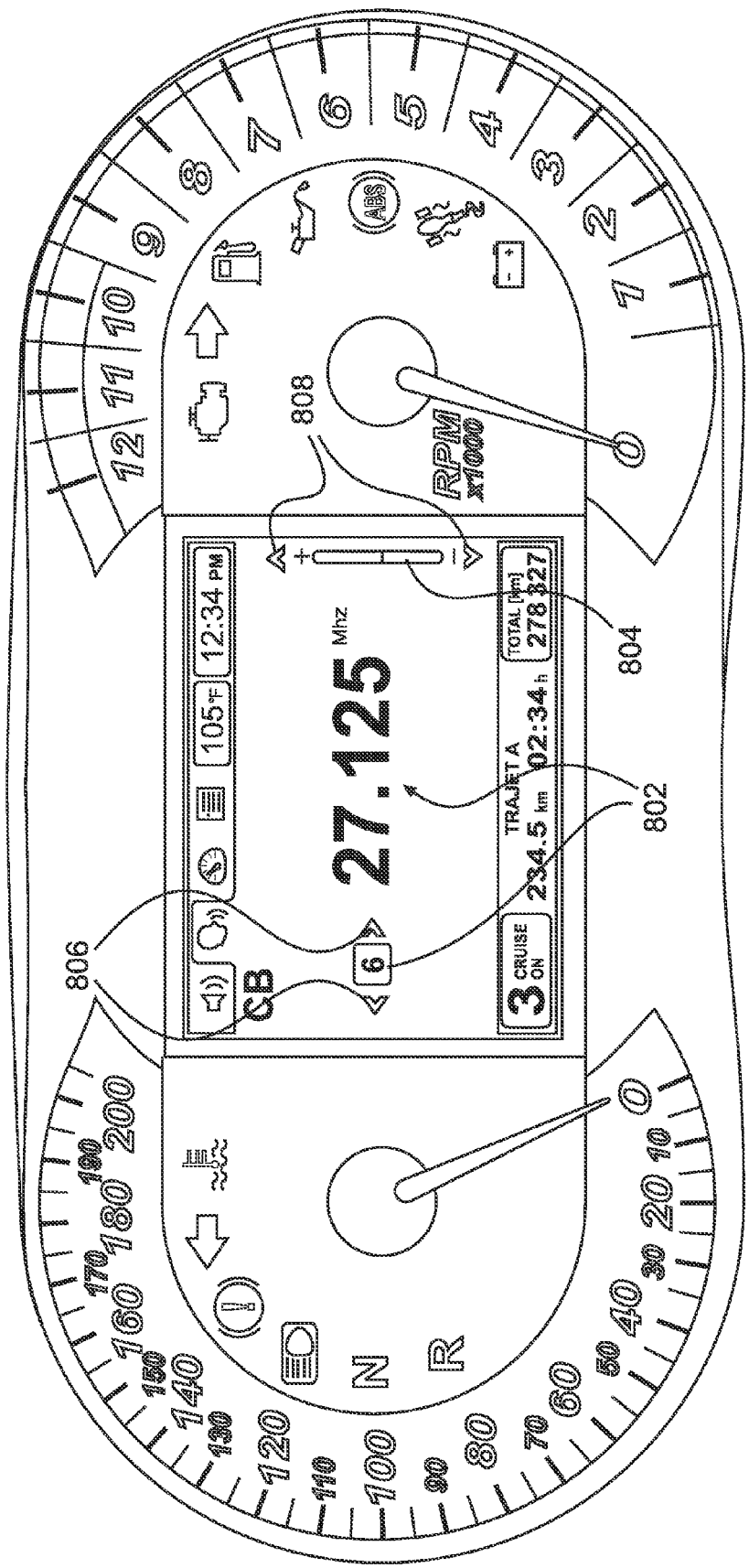
FIG. 8 is an elevation view of the vehicle display cluster in a CB radio mode.

FIG. 8 shows the display in a CB radio mode 1320. The CB radio mode 1320 is associated with a CB radio 104 installed in the vehicle 10 or connectable to the vehicle 10. The screen 418 displays information regarding the status of the CB radio 104. Numbers 802 represent the current channel number and frequency. A bar 804 indicates the sound volume. The screen 418 also displays information indicative of the function of the buttons 254. Horizontal arrows 806 indicate that the function of the left and right buttons 254 is to change the channel number. Vertical arrows 808 indicate that the function of the top and bottom buttons 254 is to raise or lower the volume.

Figure 9A:
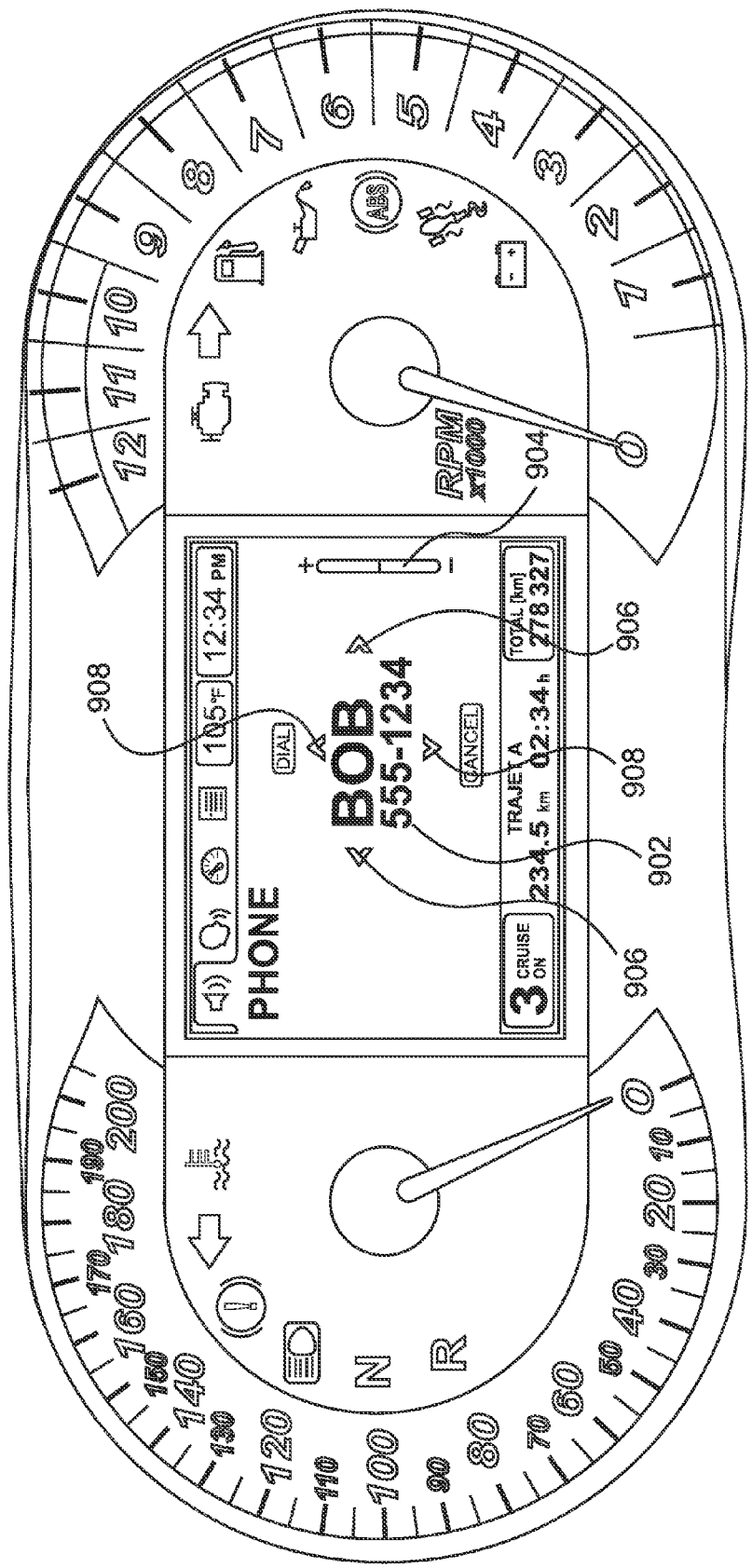
FIGS. 9A and 9B are elevation views of the vehicle display cluster in a cellular phone mode, showing different display configurations.

FIG. 9A shows the display in a cellular phone mode 1330. The cellular phone mode 1330 is associated with a cellular phone 116 connectable to the vehicle 10. The screen 418 displays information regarding the status of the cellular phone 116. Text 902 indicates the name and phone number of the person to be called. A bar 904 indicates the sound volume. The screen 418 also displays information indicative of the function of the buttons 254. Horizontal arrows 906 indicate that the function of the left and right buttons 254 is to select a different person from an address book stored in the cellular phone. Vertical arrows 908 indicate that the function of the top button 254 is to dial the number displayed, and the function of the bottom button 254 is to cancel making the call.

Figure 9B:
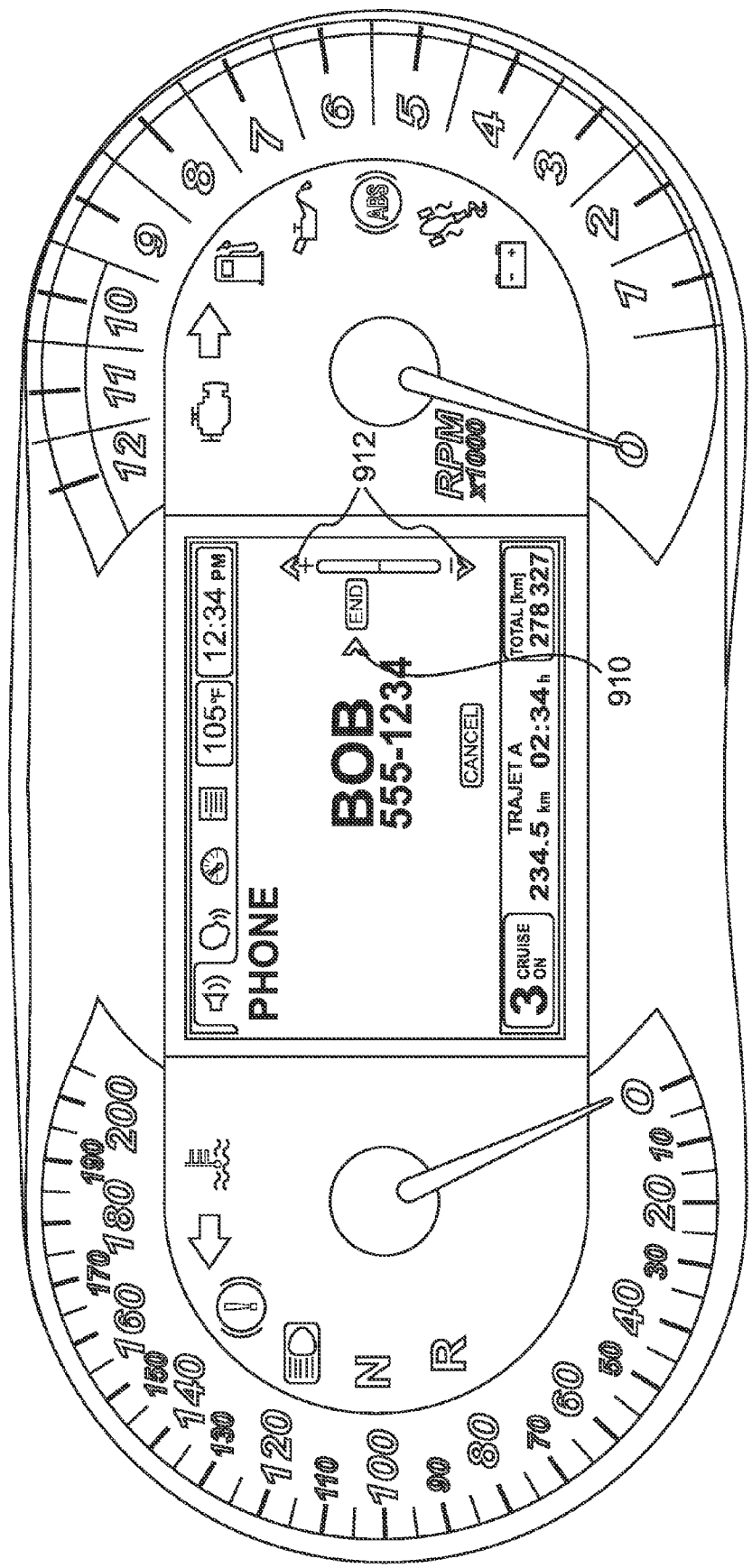

FIG. 9B shows the display in the cellular phone mode 1330, during a phone call. The horizontal arrow 910 indicates that the function of the right button 254 is to end the call. Vertical arrows 912 indicate that the function of the top and bottom buttons 254 is to raise or lower the volume.

Figure 10:
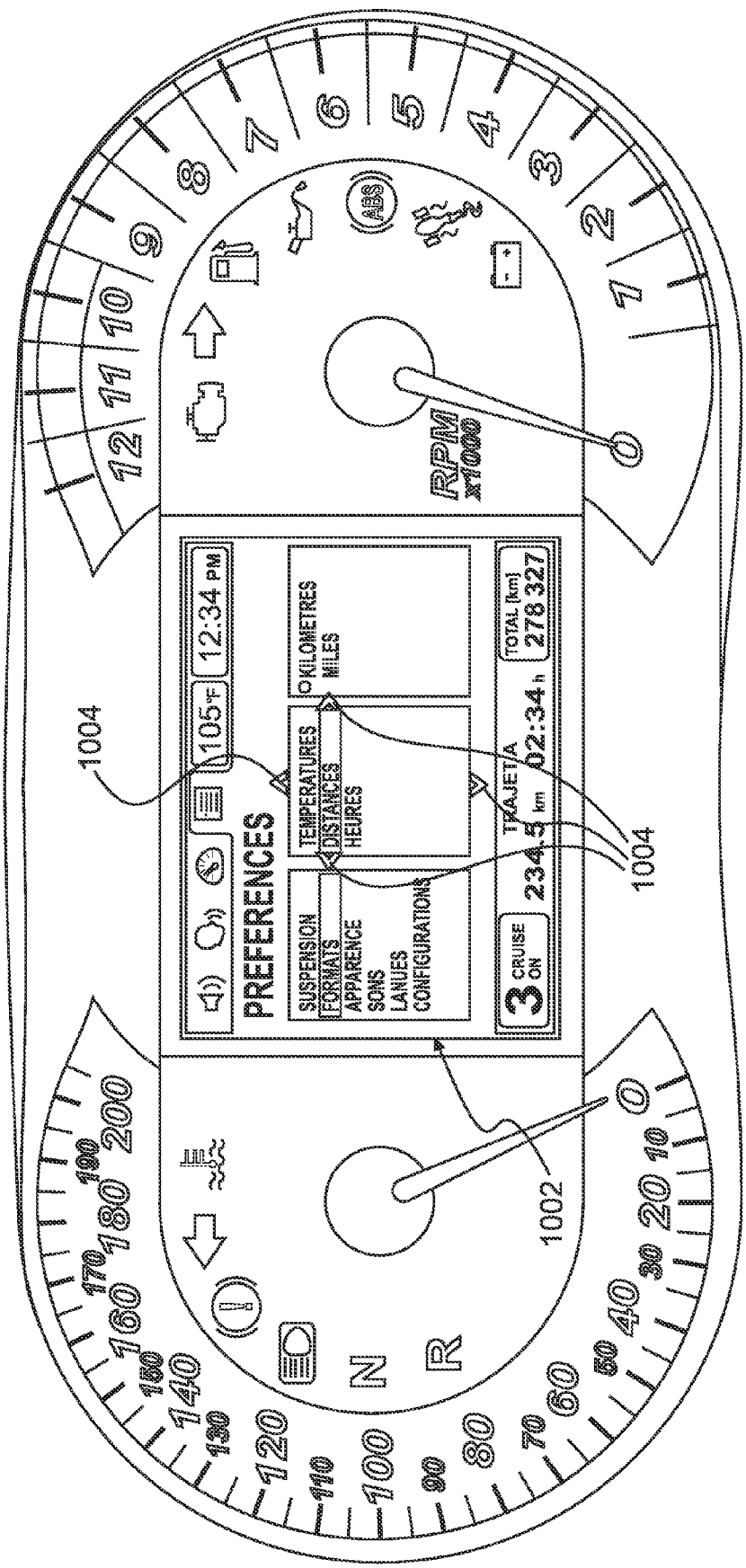
FIG. 10 is an elevation view of the vehicle display cluster in a preference mode.

FIG. 10 shows the display in a preference mode 1340. The preference mode is not associated with any particular audio signal transmitting device. The screen 418 shows a menu 1002 from which the user can select options to configure at least one parameter of at least one display mode, such as the appearance and language of the display, what information is displayed in each mode, and whether the information is displayed in metric or imperial units. The menu 1002 may also be used to associate a particular sound output device with one or more of the audio signal transmitting devices. For example, the rider may use the menu 1002 to associate the speakers 118 with the CD player 102, and may associate the wireless transceiver 122 with the cellular phone 116 for added privacy. The menu 1002 may also be used to select different sound output devices for the driver and passenger, such as separate wireless transceivers 122 in the driver's and passenger's respective helmets. The menu 1002 is navigated by the buttons 254 similarly to the menu 618 of FIG. 6C, as indicated by the arrows 1004.

Figure 11:
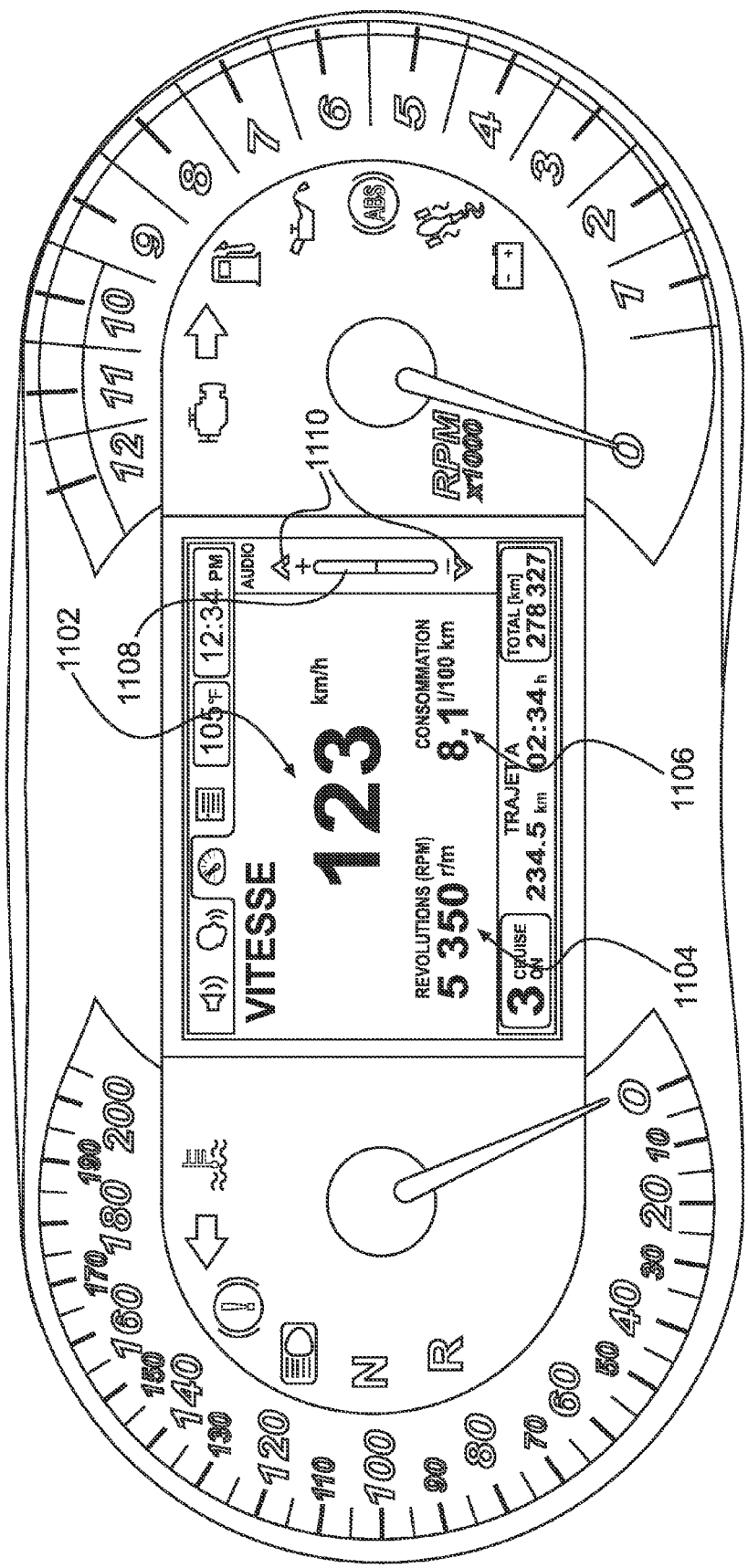
FIG. 11 is an elevation view of the vehicle display cluster in a status mode.

FIG. 11 shows the display in a status mode 1300. The status mode is not associated with any particular audio signal transmitting device. As described above, when the status mode 1300 is entered from another mode associated with an audio signal transmitting device, the output of the previously selected audio signal transmitting device continues to be sent to the selected sound output device. The status mode displays information indicative of the status of the vehicle 10, such as the current speed 1102, the current engine speed 1104, and the current rate of fuel consumption 1106. It is contemplated that in the status mode 1300 the display may alternatively show other information indicative of the status of the vehicle 10. The status mode also displays a bar 1108 indicating the sound volume. Vertical arrows 1110 indicate that the function of the top and bottom buttons 254 is to raise or lower the volume of the audible sound output. In this way, the rider can advantageously use the top and bottom buttons 254 to adjust the volume of the audible sound output in a plurality of modes, including the status mode 1300 which is not associated with an audio signal transmitting device.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a frame;
   a vehicle body connected to the frame;
   an engine supported at least in part by the frame for powering the vehicle;
   at least one seat supported by the frame for receiving a rider thereon;
   a handlebar disposed at least in part forwardly of the seat for steering the vehicle, the handlebar having two handles;
   a display device disposed forwardly of the seat for displaying information to the rider, the display device having a plurality of selectable display modes;
   a control unit electronically connected to the display device;
   at least one audio signal transmitting device electronically connected to the control unit, each of the at least one audio signal transmitting device having at least one display mode associated therewith;
   at least one sound output device electronically connected to the control unit, the at least one sound output device being operative to receive an output of the at least one audio signal transmitting device and output audible sound to a rider; and
   first and second pluralities of buttons disposed on a generally rear-facing side of the handlebar next to one of the two handles, each of the first and second pluralities of buttons being electrically connected to the control unit, each of the first and second pluralities of buttons being positioned in proximity of the one of the two handles,
   the first plurality of buttons including four first buttons arranged in a generally circular pattern; and
   the second plurality of buttons including two second buttons arranged side by side in proximity to the generally circular pattern, the two second buttons being positioned at approximately the same distance from the generally circular pattern;
   wherein:
      one of the two second buttons is operative to select a display mode of the display device from the plurality of display modes;
      the first plurality of buttons is operative to control the output of the audio signal transmitting device associated with the selected display mode;
      the control unit causes an output of the sound-producing device associated with the selected mode to be transmitted to the rider via the at least one sound output device; and
      another of the two second buttons is operative to change a function of at least one of the first plurality of buttons in at least one of the plurality of display modes.

2. The vehicle of claim 1, wherein the two second buttons are arranged side by side above the generally circular pattern.

3. The vehicle of claim 1, wherein the four first buttons include:
   a top button disposed above a center of the generally circular pattern;
   a bottom button disposed below the center of the generally circular pattern;
   a left button disposed leftwardly of the center of the generally circular pattern; and
   a right button disposed rightwardly of the center of the generally circular pattern.

4. The vehicle of claim 3, wherein the top and bottom buttons are operative to control a volume of the audible sound output by the at least one sound output device in at least two of the plurality of display modes.

5. The vehicle of claim 1, wherein the plurality of selectable display modes include at least two display modes selected from:
   a CB mode associated with a CB radio electronically connected to the vehicle;
   a radio mode associated with at least one of an AM, FM or satellite radio electronically connected to the vehicle;
   a first auxiliary mode associated with a first auxiliary device electronically connected to the vehicle;
   a second auxiliary mode associated with a second auxiliary device electronically connected to the vehicle;
   a status mode, the output of the status mode of the display device being indicative of a status of the vehicle; and
   a preference mode, wherein the four first buttons being operative to configure at least one parameter of at least one display mode of the display device when the preference mode is selected.

6. The vehicle of claim 5, wherein the output of the display device is indicative of a function of at least one of the four first buttons for the selected mode.

7. The vehicle of claim 5, further comprising a vehicle speed sensor electronically connected to the control unit, the vehicle speed sensor sending a signal representative of vehicle speed to the control unit;
   wherein:
      one of the at least two display modes is the preference mode; and
      the control unit prevents the preference mode from being selected if the vehicle speed is above a predetermined threshold speed.

8. The vehicle of claim 5, wherein:
   the control unit selects a predetermined one of the plurality of selectable display modes if the control unit has not received an input from either one of the first and second pluralities of buttons for a predetermined period of time.

9. The vehicle of claim 8, wherein the predetermined one of the plurality of selectable display modes is the status mode.

10. The vehicle of claim 1, wherein:
    the at least one sound output device is at least two sound output devices;
    the second plurality of buttons is operative to select at least one of the at least two sound output devices in at least one of the plurality of display modes; and
    the control unit causes the output of the at least one audio signal transmitting device associated with the selected display mode to be received by the selected one of the at least two sound output devices.

11. The vehicle of claim 10, wherein the top and bottom buttons are operative to control a volume of the audible sound output by the selected sound output device in at least two of the plurality of display modes.

12. The vehicle of claim 1, wherein a center of the generally circular pattern is within about 52 mm of an inside end of the one of the two handles.

13. The vehicle of claim 1, further comprising a housing disposed adjacent the inside end of the one of the two handles, wherein the first and second pluralities of buttons are disposed on the housing.

14. A vehicle comprising:
    a frame;
    a vehicle body connected to the frame;
    an engine supported at least in part by the frame for powering the vehicle;

at least one seat supported by the frame for receiving a rider thereon;

a handlebar disposed at least in part forwardly of the seat for steering the vehicle, the handlebar having two handles;

a display device disposed forwardly of the seat for displaying information to the rider, the display device having a plurality of selectable display modes;

a control unit electronically connected to the display device;

at least one audio signal transmitting device electronically connected to the control unit, each of the at least one audio signal transmitting device having at least one display mode associated therewith;

at least one sound output device electronically connected to the control unit, the at least one sound output device being operative to receive an output of the at least one audio signal transmitting device and output audible sound to a rider; and a plurality of first buttons disposed on a generally rear-facing side of the handlebar next to one of the two handles, each of the plurality of first buttons being electrically connected to the control unit, each of the plurality of first buttons being positioned in proximity of the one of the two handles, the plurality of first buttons including four first buttons arranged in a generally circular pattern; and at least one second button arranged in proximity to the generally circular pattern;

wherein:
the at least one second button is operative to select a display mode of the display device from the plurality of display modes;

the plurality of first buttons is operative to control the output of the audio signal transmitting device associated with the selected display mode;

the control unit causes an output of the sound-producing device associated with the selected mode to be transmitted to the rider via the at least one sound output device; and the at least one second button is operative to change a function of at least one of the first plurality of buttons upon selection of a display mode.

15. The vehicle of claim 14, wherein:

the at least one second button includes two second buttons arranged side by side above the generally circular pattern, one of the two second buttons is operative to select a display mode of the display device from the plurality of display modes;

the other of the two second buttons is operative to change a function of at least one of the first plurality of buttons in at least one of the plurality of display modes.

16. The vehicle of claim 14, wherein the four first buttons include:

a top button disposed above a center of the generally circular pattern;

a bottom button disposed below the center of the generally circular pattern;

a left button disposed leftwardly of the center of the generally circular pattern; and a right button disposed rightwardly of the center of the generally circular pattern.

17. The vehicle of claim 16, wherein the top and bottom buttons are operative to control a volume of the audible sound output by the at least one sound output device in at least two of the plurality of display modes.

18. The vehicle of claim 14, wherein the plurality of selectable display modes include at least two display modes selected from:

a CB mode associated with a CB radio electronically connected to the vehicle;

a radio mode associated with at least one of an AM, FM or satellite radio electronically connected to the vehicle;

a first auxiliary mode associated with a first auxiliary device electronically connected to the vehicle;

a second auxiliary mode associated with a second auxiliary device electronically connected to the vehicle;

a status mode, the output of the status mode of the display device being indicative of a status of the vehicle; and a preference mode, wherein the four first buttons being operative to configure at least one parameter of at least one display mode of the display device when the preference mode is selected.

19. The vehicle of claim 1, wherein the first and second pluralities of buttons are arranged such that when a hand of an operator is disposed on the one of the two handles, the first and second pluralities of buttons are within reach of a thumb of the hand.

20. The vehicle of claim 14, wherein the first plurality of buttons and the at least one second are arranged such that when a hand of an operator is disposed on the one of the two handles, the first plurality of buttons and the at least one second button are within reach of a thumb of the hand.

* * * * *